United States Patent
Ichihara

(10) Patent No.: US 11,398,638 B2
(45) Date of Patent: Jul. 26, 2022

(54) CELL STRUCTURE FOR FUEL CELL AND FUEL CELL SYSTEM

(71) Applicant: NISSAN MOTOR CO., LTD., Yokohama (JP)

(72) Inventor: Keiji Ichihara, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 143 days.

(21) Appl. No.: 16/636,691

(22) PCT Filed: Aug. 10, 2017

(86) PCT No.: PCT/JP2017/029206
§ 371 (c)(1),
(2) Date: Feb. 5, 2020

(87) PCT Pub. No.: WO2019/030918
PCT Pub. Date: Feb. 14, 2019

(65) Prior Publication Data
US 2020/0168931 A1 May 28, 2020

(51) Int. Cl.
*H01M 8/04701* (2016.01)
*H01M 8/04225* (2016.01)
(Continued)

(52) U.S. Cl.
CPC ..... *H01M 8/04731* (2013.01); *H01M 8/0273* (2013.01); *H01M 8/04007* (2013.01);
(Continued)

(58) Field of Classification Search
None
See application file for complete search history.

(56) References Cited

U.S. PATENT DOCUMENTS 5,691,075 A 11/1997 Batawi
8,658,328 B2 2/2014 Suda et al.
(Continued)

FOREIGN PATENT DOCUMENTS

CN 104218252 A 12/2014
JP 2002-203581 A 7/2002
(Continued)

OTHER PUBLICATIONS

JP2007213965A—Machine translation (Year: 2007).*

*Primary Examiner* — Haroon S. Sheikh
(74) *Attorney, Agent, or Firm* — Foley & Lardner LLP

(57) ABSTRACT

A cell structure for a fuel cell including: power generation cell assemblies each including a power generation cell which includes a fuel electrode, an oxidant electrode, and an electrolyte sandwiched therebetween and is configured to generate power by using supplied gases; a separator configured to separate the adjacent power generation cell assemblies from each other; a sealing member disposed between an edge of a corresponding one of the power generation cell assemblies and an edge of the separator and configured to retain any of the gases supplied to the power generation cells between the corresponding power generation cell assembly and the separator; and a heat exchange part disposed adjacent to the sealing member and configured to perform temperature control of the sealing member by using any of the gases supplied to the power generation cells.

12 Claims, 14 Drawing Sheets

(51) Int. Cl.

|  |  |
|---|---|
| *H01M 8/04302* | (2016.01) |
| *H01M 8/0273* | (2016.01) |
| *H01M 8/04007* | (2016.01) |
| *H01M 8/04082* | (2016.01) |
| *H01M 8/04746* | (2016.01) |
| *H01M 8/2465* | (2016.01) |

(52) U.S. Cl.
CPC ... *H01M 8/04201* (2013.01); *H01M 8/04225* (2016.02); *H01M 8/04302* (2016.02); *H01M 8/04753* (2013.01); *H01M 8/2465* (2013.01)

(56) References Cited

U.S. PATENT DOCUMENTS

| | | |
|---|---|---|
| 2007/0092781 A1 | 4/2007 | Potnis et al. |
| 2011/0111320 A1 | 5/2011 | Suda et al. |
| 2011/0117466 A1 | 5/2011 | Badding |
| 2012/0178011 A1 | 7/2012 | Sugiura et al. |

FOREIGN PATENT DOCUMENTS

| | | |
|---|---|---|
| JP | 2007-123241 A | 5/2007 |
| JP | 2007213965 A * | 8/2007 |
| JP | 2008-146972 A | 6/2008 |
| JP | 2011-522375 A | 7/2011 |
| JP | 2014-56824 A | 3/2014 |
| JP | 2014-207120 A | 10/2014 |
| WO | WO-99/57776 A1 | 11/1999 |
| WO | WO-2009/148505 A2 | 12/2009 |

* cited by examiner

CELL STRUCTURE FOR FUEL CELL AND FUEL CELL SYSTEM

TECHNICAL FIELD

The present invention relates to a cell structure for a fuel cell and to a fuel cell system.

BACKGROUND ART

A conventional solid oxide fuel cell (SOFC) stack is configured to generate power by feeding gases to power generation cells each formed by sandwiching an electrolyte between a fuel electrode and an oxidant electrode.

For this reason, power generation cell assemblies (single cells) each including the power generation cell and separators for separating the adjacent power generation cell assemblies are stacked on one another while interposing sealing members (sealing portions). The solid oxide fuel cell stack needs to be heated to a high temperature at several hundred degrees or above in order to achieve a steady operation (see Patent Literature 1, for example).

In the configuration of Patent Literature 1, when the solid oxide fuel cell stack is steadily operated, a temperature gradient between each power generation cell assembly and the corresponding sealing member or between each separator and the corresponding sealing member is sufficiently small and temperature distribution on each sealing member becomes substantially equal. Hence, there is little risk of damage on the sealing members.

CITATION LIST

Patent Literature

Patent Literature 1: Japanese Patent Application Publication No. 2014-56824

SUMMARY OF INVENTION

Technical Problem

If the solid oxide fuel cell stack of the configuration according to Patent Literature 1 is quickly activated, a high-temperature gas is likely to develop a sharp temperature gradient between the power generation cell assembly and the sealing member or between the separator and the sealing member, and may damage the sealing member which is relatively fragile.

An object of the present invention is to provide a cell structure for a fuel cell and to provide a fuel cell system, which can be quickly activated while protecting a sealing member disposed between a power generation cell assembly and a separator.

Solution to Problem

To attain the object, a cell structure for a fuel cell of the present invention includes power generation cell assemblies, a separator, sealing members, and a heat exchange part. Each power generation cell assembly includes a power generation cell which has a fuel electrode, an oxidant electrode, and an electrolyte sandwiched between the fuel electrode and the oxidant electrode and is configured to generate power by using gases supplied thereto. The separator separates the adjacent power generation cell assemblies from each other. Each sealing member is disposed between an edge of the corresponding power generation cell assembly and an edge of the separator and retains any of the gases, which are to be supplied to the power generation cells, between the power generation cell assembly and the separator. The heat exchange part is disposed adjacent to the sealing members and performs temperature control of the sealing members by using any of the gases supplied to the power generation cells.

To attain the object, a fuel cell system of the present invention includes a fuel cell stack formed by stacking power generation cell assemblies, a fuel supply subsystem that supplies a fuel to the fuel cell stack, an air supply subsystem that supplies air to the fuel cell stack, an exhaust subsystem that discharges an exhaust gas from the fuel cell stack, and a control device configured to control the subsystems.

In the fuel cell system, each power generation cell assembly includes a heat exchange part that performs temperature control of sealing members disposed in the cell assembly, and the control device selectively activates the heat exchange part at system start-up.

DESCRIPTION OF EMBODIMENTS

Figure 1:
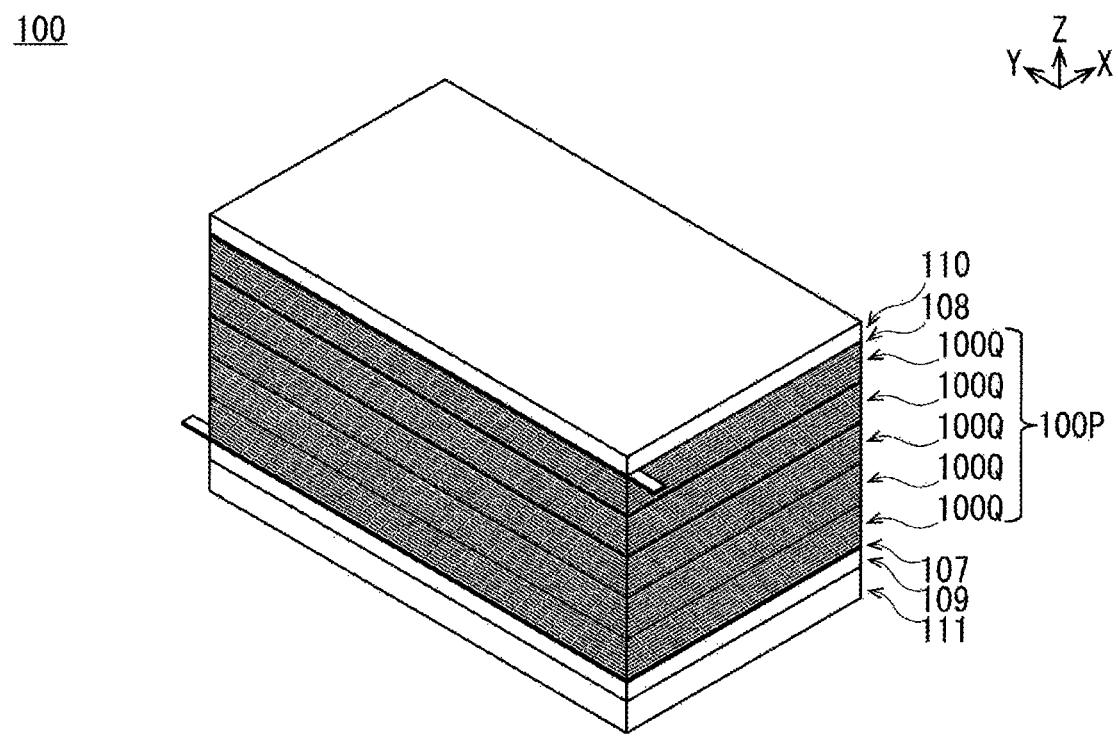
FIG. 1 is a perspective view showing a solid oxide fuel cell stack of a first embodiment.

First to third embodiments of the present invention will be described below with reference to the accompanying drawings. In the drawings, the same elements are denoted by the same reference signs and overlapping explanations thereof will be omitted. In the drawings, sizes and proportions of the respective elements may be exaggerated in order to facilitate the understandings of the first and second embodiments and may therefore be different from actual sizes and proportions thereof.

In the drawings, orientations of elements constituting a solid oxide fuel cell stack are indicated by using arrows denoted by X, Y, and Z. A direction of the arrow denoted by X shows a lateral direction X of the solid oxide fuel cell stack. A direction of the arrow denoted by Y shows a longitudinal direction Y of the solid oxide fuel cell stack. A direction of the arrow denoted by Z shows a stacking direction Z of the solid oxide fuel cell stack.

First Embodiment (Configuration of Solid Oxide Fuel Cell Stack 100)

Figure 2:
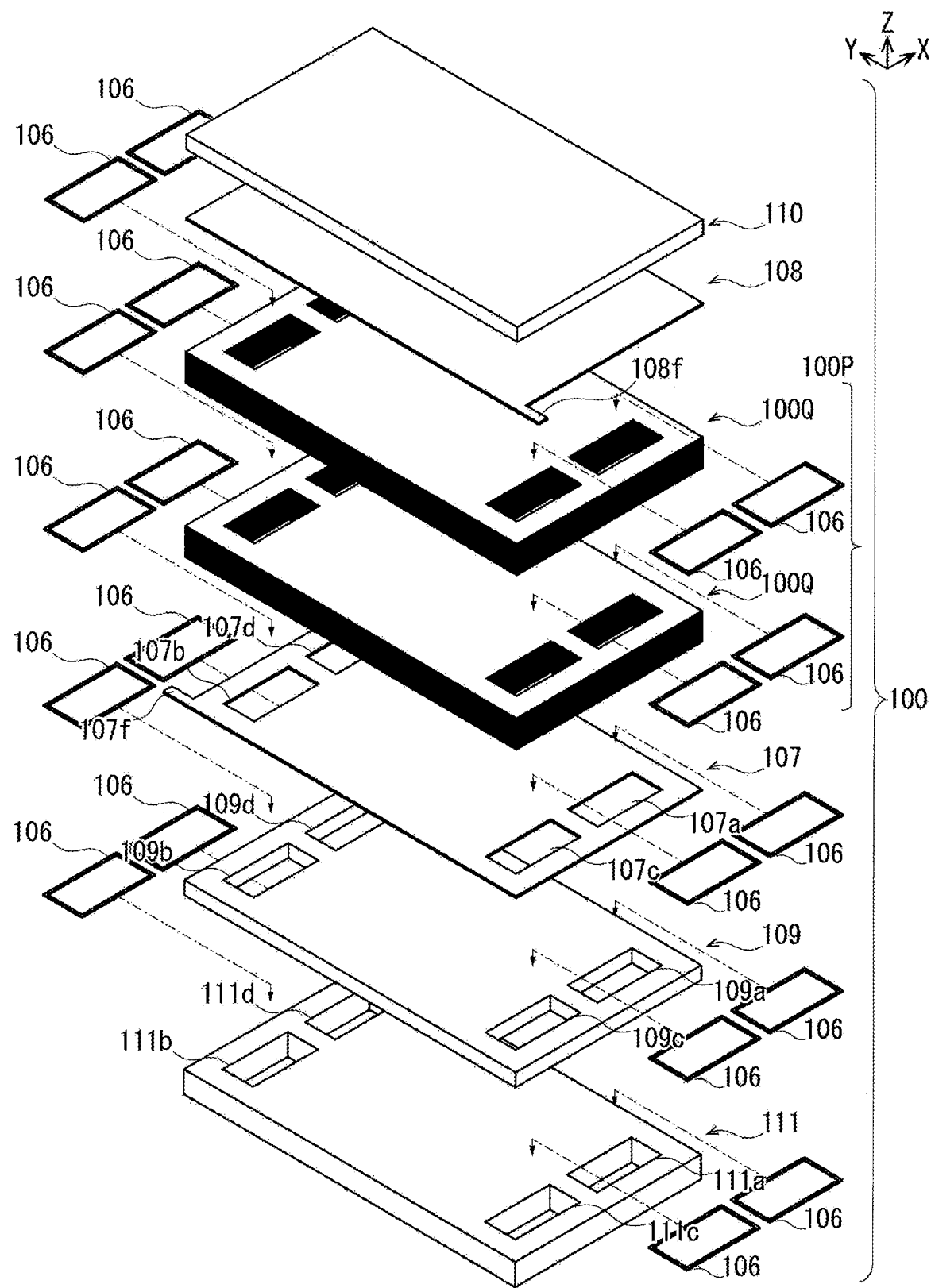
FIG. 2 is a perspective view showing a state of breaking down the solid oxide fuel cell stack in FIG. 1 into an upper end plate, an upper current collector plate, a stack formed by stacking cell modules, a lower current collector plate, a lower end plate, and an external manifold.
Figure 3:
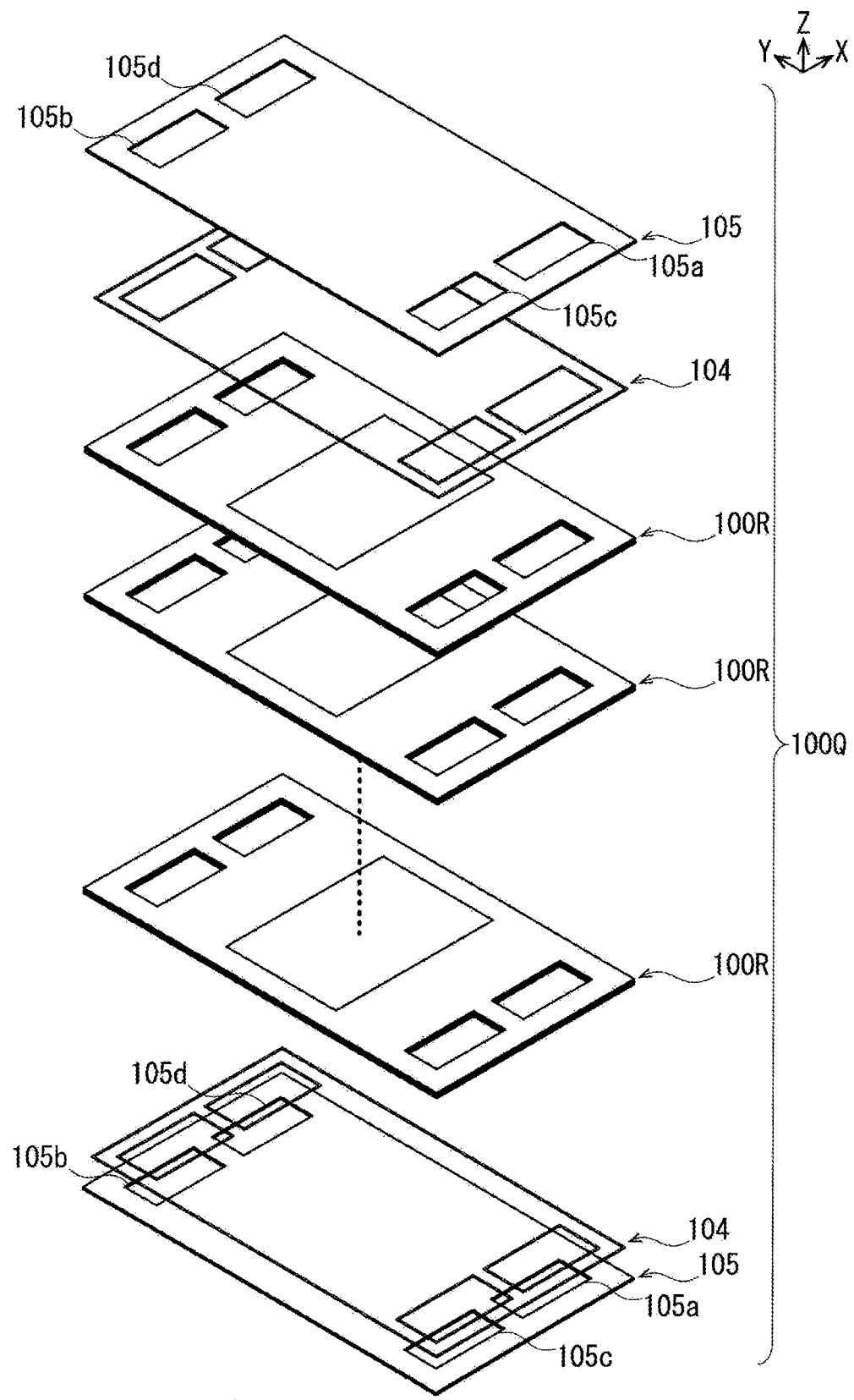
FIG. 3 is an exploded perspective view of a cell module in FIG. 2.
Figure 4:
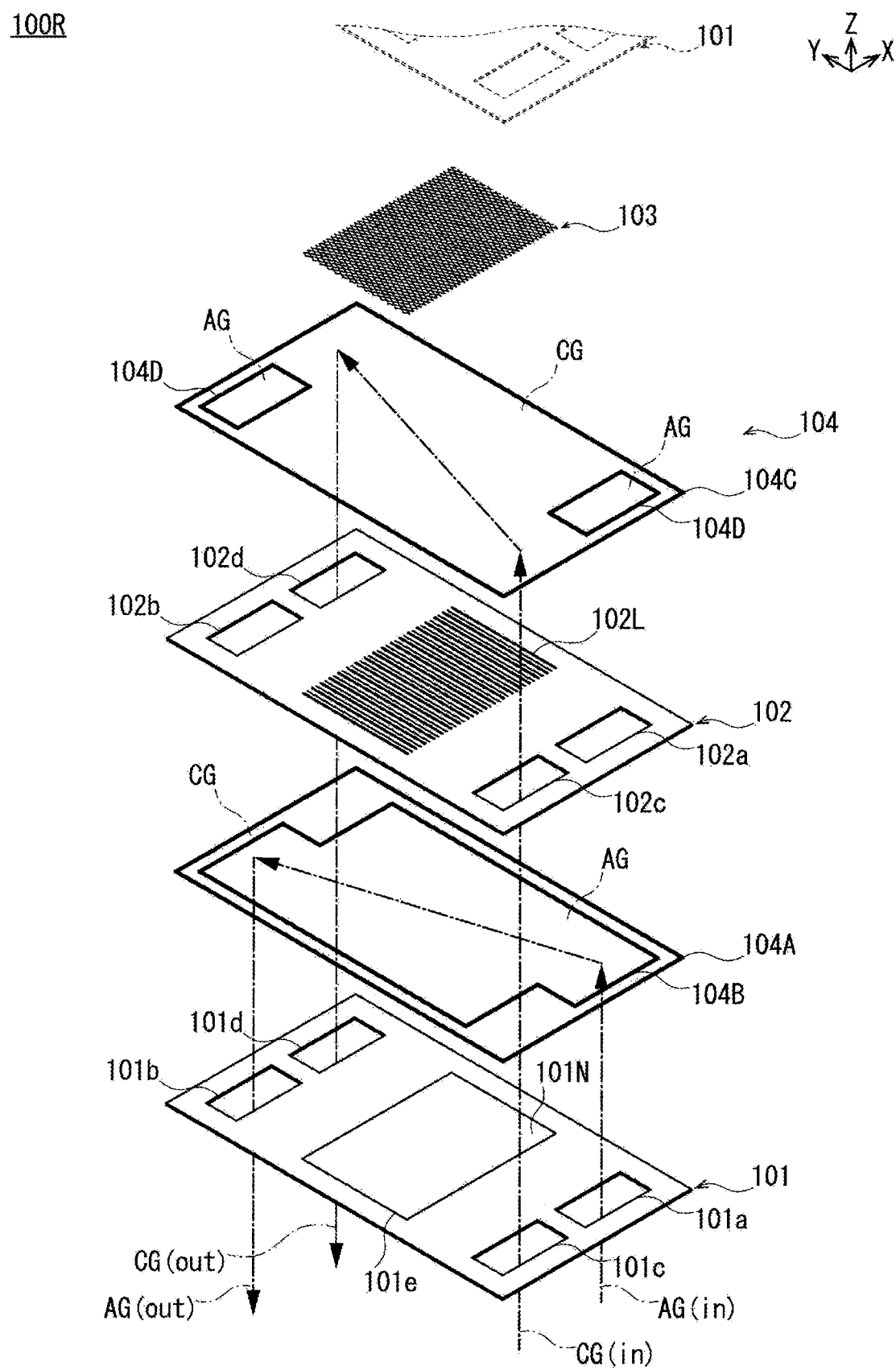
FIG. 4 is an exploded perspective view of a unit in FIG. 3.

FIG. 1 is a perspective view showing a solid oxide fuel cell stack 100 of a first embodiment. FIG. 2 is a perspective view showing a state of breaking down the solid oxide fuel cell stack 100 in FIG. 1 into an upper end plate 110, an upper current collector plate 108, a stack 100P formed by stacking cell modules 100Q, a lower current collector plate 107, a lower end plate 109, and an external manifold 111. FIG. 3 is an exploded perspective view of a cell module 100Q in FIG. 2. FIG. 4 is an exploded perspective view of a unit 100R in FIG. 3.

Figure 5A:
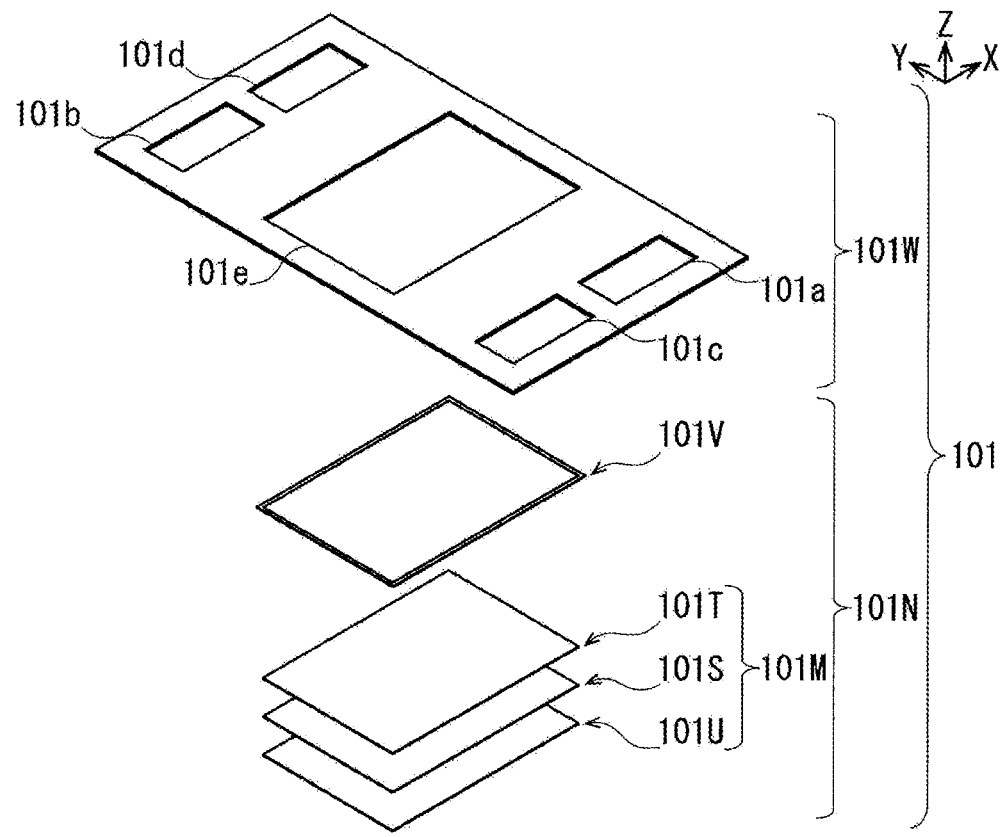
FIG. 5A is an exploded perspective view of a metal support cell assembly in FIG. 4.
Figure 5B:
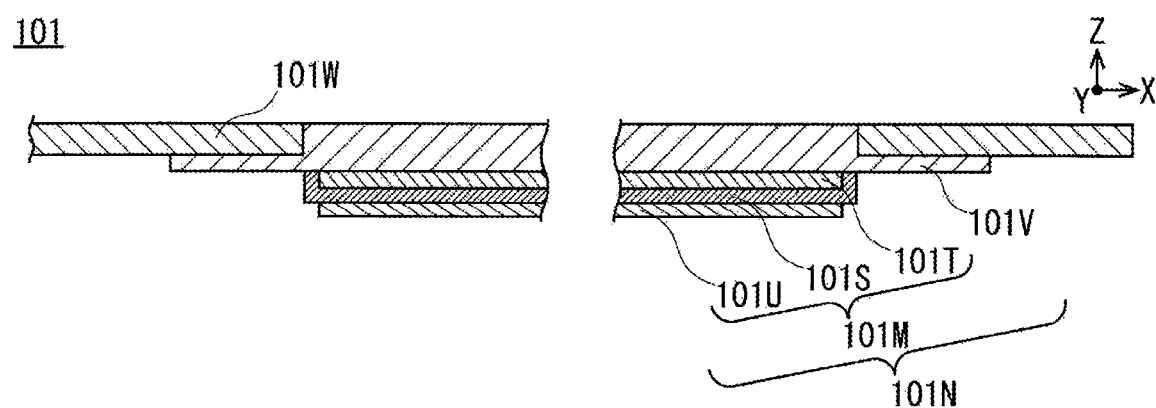
FIG. 5B is a side view showing a cross-section of the metal support cell assembly in FIG. 4.
Figure 6:
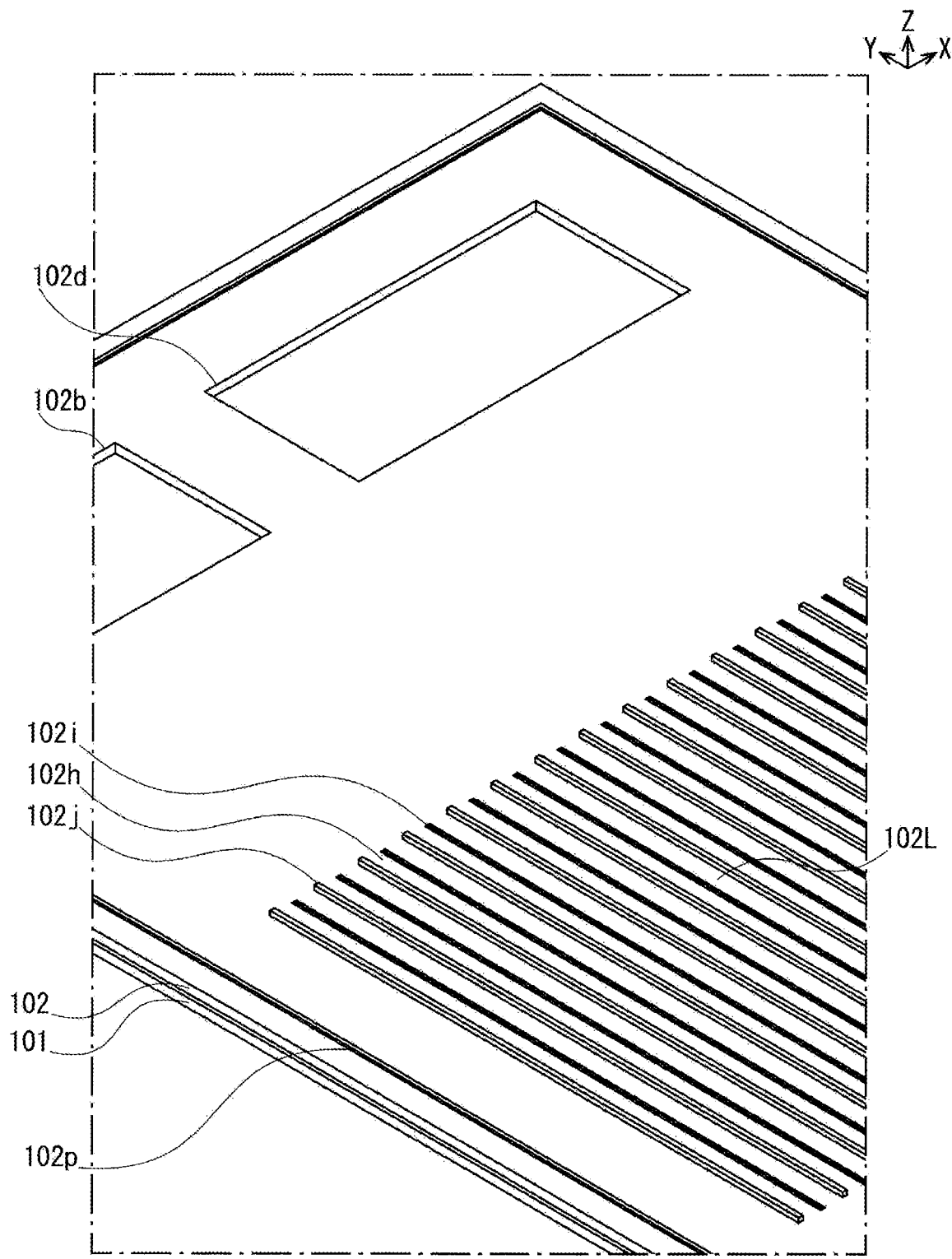
FIG. 6 is a perspective view partially showing a stacked state of the metal support cell assembly, a separator, an anode outer edge sealing member, and a cathode outer edge sealing member.
Figure 7:
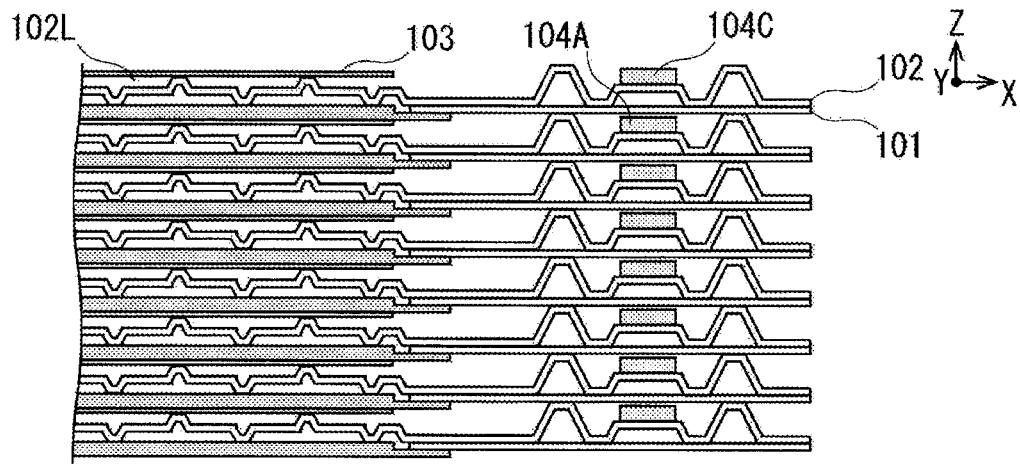
FIG. 7 is a side view showing a cross-section of the stacked state of the configuration in FIG. 6.
Figure 8:
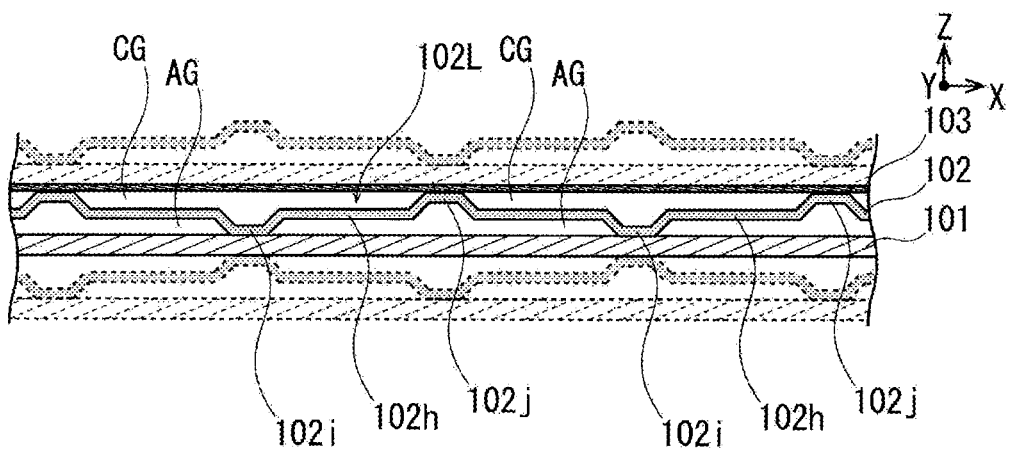
FIG. 8 is a side view showing a cross-section of a power generation area in FIG. 6.
Figure 9:
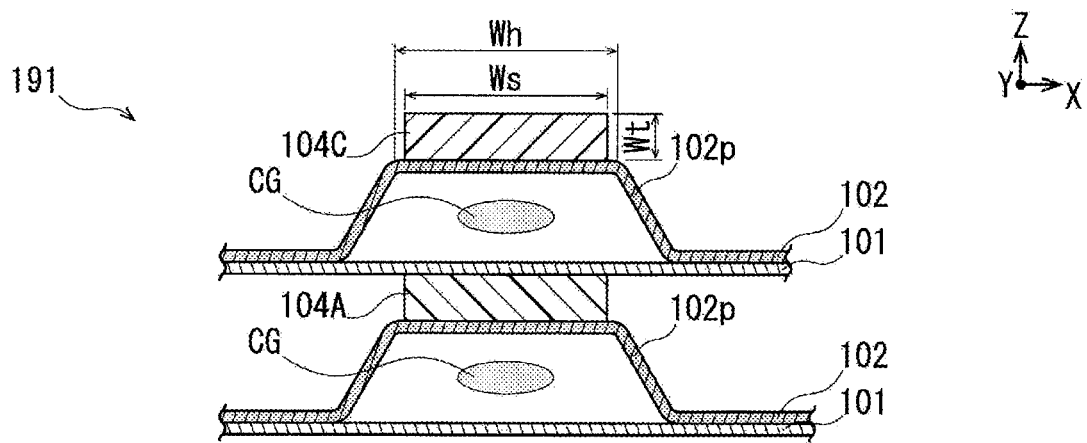
FIG. 9 is a side view showing a cross-section of a heat exchange part in FIG. 6.

FIG. 5A is an exploded perspective view of a metal support cell assembly 101 in FIG. 4. FIG. 5B is a side view showing a cross-section of the metal support cell assembly 101 in FIG. 4. FIG. 6 is a perspective view partially showing a stacked state of the metal support cell assembly 101, a separator 102, an anode outer edge sealing member 104A, and a cathode outer edge sealing member 104C. FIG. 8 is a side view showing a cross-section of a power generation area in FIG. 6. FIG. 9 is a side view showing a cross-section of a heat exchange part in FIG. 6.

Figure 10:
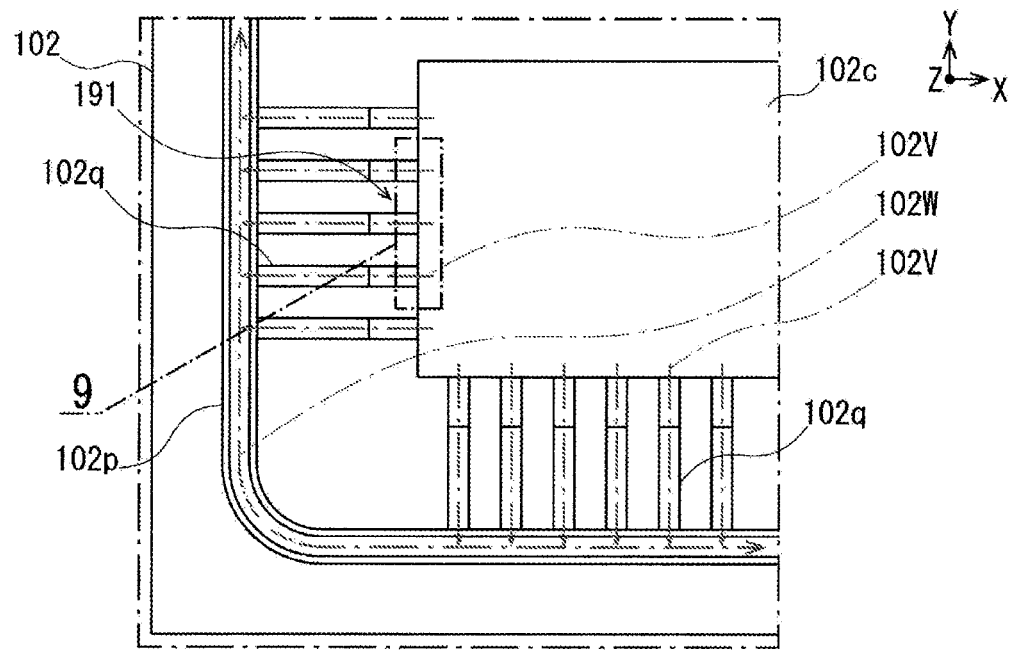
FIG. 10 is a top plan view showing a circumference of a cathode inlet in the stacked state of the metal support cell assembly, the separator, the anode outer edge sealing member, and the cathode outer edge sealing member according to the solid oxide fuel cell stack of the first embodiment.
Figure 11:
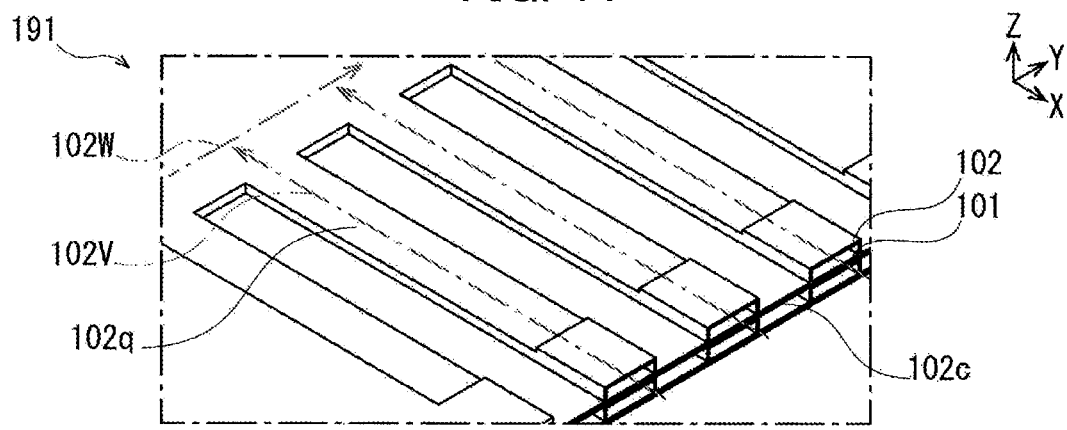
FIG. 11 is a perspective view showing branched parts for a cathode gas in FIG. 10.
Figure 12:
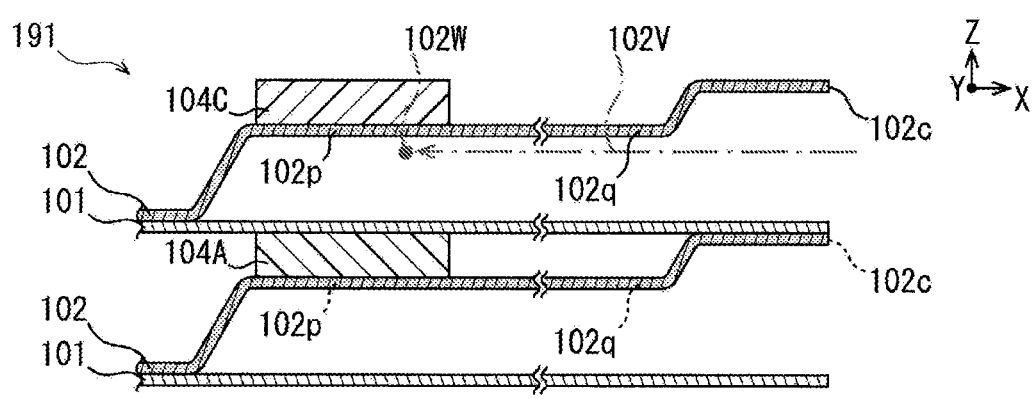
FIG. 12 is a side view showing a cross-section of the branched parts for the cathode gas in FIG. 10.

FIG. 10 is a top plan view showing a circumference of a cathode inlet 102c in the stacked state of the metal support cell assembly 101, the separator 102, the anode outer edge sealing member 104A, and the cathode outer edge sealing member 104C according to the solid oxide fuel cell stack 100 of the first embodiment. FIG. 11 is a perspective view showing branched parts for a cathode gas CG in FIG. 10. FIG. 12 is a side view showing a cross-section of the branched parts for the cathode gas CG in FIG. 10.

Regarding the solid oxide fuel cell stack 100, illustration of fastening members (bolts) to fasten and integrate respective constituents and of protective members (covers) to cover and protect the respective constituents is omitted in FIG. 1.

As shown in FIGS. 1 and 2, the solid oxide fuel cell stack 100 is configured to use the lower end plate 109 and the upper end plate 110 to sandwich and hold the stack 100P that is sandwiched between the lower current collector plate 107 and the upper current collector plate 108, and to dispose the external manifold 111 at a lower end thereof in order to supply gases from outside.

As shown in FIG. 2, the solid oxide fuel cell stack 100 enables current collection by sandwiching the stack 100P, which is formed by stacking the cell modules 100Q, between the lower current collector plate 107 and the upper current collector plate 108 that are configured to output power generated by units 100R to the outside.

The solid oxide fuel cell stack 100 constructs the cell module 100Q shown in FIG. 3 by stacking the units 100R shown in FIG. 4 and disposing module ends 105 corresponding to end plates through sealing unit 104 located on an upper end and a lower end as shown in FIG. 3.

The solid oxide fuel cell stack 100 generates power by supplying the gases to the unit 100R shown in FIG. 4. The unit 100R shown in FIG. 4 includes: the metal support cell assembly 101 provided with power generation cells 101M that generate power by using the supplied gases; the separator 102 that separates the adjacent power generation cells 101M from each other; a power collection assistance layer 103 that maintains electric contact while defining spaces between the power generation cell 101M and the separator 102 for allowing passage of the gases; and the sealing unit 104 that controls flows of the gases by partially sealing a gap between the metal support cell assembly 101 and the separator 102.

Structures of the respective constituents of the solid oxide fuel cell stack 100 will be described below.

As shown in FIGS. 4 to 12, the metal support cell assembly 101 is configured to generate power by using the gases supplied from the outside.

As shown in FIGS. 4, 5A, and 5B, the metal support cell assembly 101 includes the power generation cell 101M formed by sandwiching an electrolyte 101S between an anode 101T and a cathode 101U and configured to generate power by using an anode gas AG and the cathode gas CG supplied thereto, and a cell frame 101W configured to surround and hold the power generation cell 101M.

In the metal support cell assembly 101, the power generation cell 101M is formed by sandwiching the electrolyte 101S between the anode 101T and the cathode 101U as shown in FIGS. 5A and 5B. A metal support cell 101N is formed of the power generation cell 101M and a support metal 101V that supports the power generation cell 101M from one side. The metal support cell assembly 101 is formed from the metal support cell 101N and the cell frame 101W that holds the periphery of the metal support cell 101N.

As shown in FIGS. 5A and 5B, the anode 101T is a fuel electrode that generates an oxide of the anode gas AG (such as hydrogen) by reaction of the anode gas AG with oxide ions and takes out electrons at the same time. The anode 101T has resistance to a reducing atmosphere, has permeability to the anode gas AG, has high electric conductivity, and catalyzes the reaction of the anode gas AG with the oxide ions. The anode 101T is formed into a rectangular shape smaller than the electrolyte 101S. For example, the anode 101T is made of a metal such as nickel or an alloy mixed with an oxide ion conductor such as yttria-stabilized zirconia. As shown in FIGS. 5A and 5B, the anode 101T is formed into a thin-plate shape and a rectangular shape.

As shown in FIGS. 5A and 5B, the electrolyte 101S is designed to transmit the oxide ions from the cathode 101U toward the anode 101T. The electrolyte 101S transmits the oxide ions but does not transmit the gas or the electrons. The electrolyte 101S is formed into a rectangular shape. For example, the electrolyte 101S is made of a solid oxide ceramic such as stabilized zirconia with a solid solution of any of yttria, neodymium oxide, samaria, gadolinia, scandia, and the like. As shown in FIGS. 5A and 5B, the electrolyte 101S is formed into a thin-plate shape and a rectangular shape that is slightly larger than the anode 101T. As shown in FIG. 5B, an outer edge of the electrolyte 101S is bent toward the anode 101T and is in contact with a side surface of the anode 101T extending along the stacking direction Z. A front end of the outer edge of the electrolyte 101S is in contact with the support metal 101V.

As shown in FIGS. 5A and 5B, the cathode 101U is an oxidant electrode that transforms oxygen molecules into the oxide ions by reaction of the cathode gas CG (such as oxygen contained in the air) with the electrons. The cathode 101U has resistance to an oxidizing atmosphere, has permeability to the cathode gas CG, has high electric conductivity, and catalyzes the transformation of the oxygen molecules into the oxide ions. The cathode 101U is formed into a rectangular shape smaller than the electrolyte 101S. For example, the cathode 101U is made of an oxide of any of lanthanum, strontium, manganese, cobalt, and the like. As shown in FIGS. 5A and 5B, the cathode 101U is formed into a thin-plate shape and a rectangular shape as with the anode 101T. The cathode 101U is opposed to the anode 101T through the intermediary of the electrolyte 101S. Since the outer edge of the electrolyte 101S is bent toward the anode 101T, an outer edge of the cathode 101U does not come into contact with an outer edge of the anode 101T.

As shown in FIGS. 5A and 5B, the support metal 101V is configured to support the power generation cell 101M from the anode 101T side. The support metal 101V has permeability to the gas, has high electric conductivity, and has sufficient strength. The support metal 101V is formed into a rectangular shape larger than the electrolyte 101S. For example, the support metal 101V is made of a corrosion-resistant alloy or corrosion-resistance steel containing nickel or chromium, or stainless steel.

As shown in FIGS. 4, 5A, and 5B, the cell frame 101W is configured to protect the periphery of the metal support cell 101N. The cell frame 101W is formed into a rectangular shape. The cell frame 101W is provided with an opening 101e located at the center for attaching the power generation cell 101M. The opening 101e of the cell frame 101W is formed from a rectangular through hole which is smaller than a profile of the support metal 101V. The cell frame 101W is made of a metal and is insulated by using either an insulating material or a coating. The insulating material is formed by fixing aluminum oxide to the cell frame 101W, for example. The metal support cell 101N is attached to the cell frame 101W by joining an outer edge of the support metal 101V to an inner edge of the opening 101e of the cell frame 101W.

As shown in FIGS. 4, 5A, and 5B, the cell frame 101W is provided with an anode inlet 101a that causes the anode gas AG to flow into a flow channel portion 102L and an anode outlet 101b that causes the anode gas AG to flow out of the flow channel portion 102L, which are located on a diagonal line extending across the opening 101e. Likewise, the cell frame 101W is provided with a cathode inlet 101c that causes the cathode gas CG to flow into the flow channel portion 102L and a cathode outlet 101d that causes the cathode gas CG to flow out of the flow channel portion 102L, which are located on another diagonal line extending across the opening 101e. The anode inlet 101a is opposed to the cathode inlet 101c along the lateral direction X of the cell frame 101W. Likewise, the anode outlet 101b is opposed to the cathode outlet 101d along the lateral direction X of the cell frame 101W. The anode inlet 101a and the cathode inlet 101c are opposed to the cathode outlet 101d and the anode outlet 101b along the longitudinal direction Y across the opening 101e. Each of the anode inlet 101a, the anode outlet 101b, the cathode inlet 101c, and the cathode outlet 101d is a manifold formed from a rectangular opening.

As shown in FIGS. 4 to 12, the separator 102 is disposed between the power generation cells 101M of the stacked metal support cell assembly 101 and configured to separate the adjacent power generation cells 101M from each other.

The separator 102 is arranged opposite to the metal support cell assembly 101. The separator 102 is formed into a similar external shape to the metal support cell assembly 101. The separator 102 is made of a metal and is insulated by using either an insulating material or a coating except for a region (the flow channel portion 102L) opposed to the power generation cells 101M. The insulating material is formed by fixing aluminum oxide to the separator 102, for example. The separator 102 is disposed such that the flow channel portion 102L is opposed to the power generation cells 101M.

As shown in FIGS. 6 and 8, the flow channel portion 102L in the separator 102 is formed such that flow channels that extend along a gas flow direction (the longitudinal direction Y) are arranged in a direction (the lateral direction X) orthogonal to the gas flow direction (the longitudinal direction Y). As shown in FIG. 8, the flow channel portion 102L is provided with convex anode projections 102i arranged at regular intervals in such a way as to project downward from a flat portion 102h that is flat within a plane in the longitudinal direction Y and the lateral direction X. The anode projections 102i extend along the gas flow direction (the longitudinal direction Y). The anode projections 102i project downward from a lower end of the separator 102. As shown in FIG. 8, the flow channel portion 102L is provided with convex cathode projections 102j arranged at regular intervals in such a way as to project upward from the flat portion 102h. The cathode projections 102j extend along the gas flow direction (the longitudinal direction Y). The cathode projections 102j project upward from an upper end of the separator 102. The flow channel portion 102L includes the anode projections 102i and the convex cathode projections 102j which are alternately disposed along the lateral direction X while interposing the flat portions 102h in between.

As shown in FIG. 8, the separator 102 defines each gap between the flow channel portion 102L and the power generation cell 101M located therebelow as a flow channel for the anode gas AG. As shown in FIG. 8, the separator 102 defines each gap between the flow channel portion 102L and the power generation cell 101M located thereabove as a flow channel for the cathode gas CG.

As shown in FIG. 4, the separator 102 is provided with an anode inlet 102a and an anode outlet 102b to allow passage of the anode gas AG, which are located on a diagonal line extending across the flow channel portion 102L such that relative positions thereof coincide with the metal support cell assembly 101 along the stacking direction Z. The separator 102 is provided with the cathode inlet 102c and a cathode outlet 102d to allow passage of the cathode gas CG, which are located on another diagonal line extending across the flow channel portion 102L such that relative positions thereof coincide with the metal support cell assembly 101 along the stacking direction Z.

As shown in FIGS. 6, and 9 to 12, the separator 102 is provided with a looped rib 102p. As shown in FIG. 6, the rib 102p is formed in such a way as to surround four sides of an outer edge of the separator 102. As shown in FIG. 9, the rib 102p is formed by bending the outer edge of the separator 102 into a convex shape so as to project upward in the stacking direction Z and to define a space therebelow. In the separators 102 that are stacked while interposing the metal support cell assembly 101 in-between, the anode outer edge sealing member 104A and the cathode outer edge sealing member 104C to be described later are alternately stacked on upper ends of the respective ribs 102p as shown in FIG. 9.

In the separator 102, branched ribs 102q extending straight from the cathode inlet 102c toward the outer edge are connected to the rib 102p as shown in FIGS. 10 to 12. Multiple branched ribs 102q are provided along the lateral direction X and the longitudinal direction Y of the separator 102 in such a way as to connect the rectangular cathode inlet 102c to the rib 102p. Each of the rib 102p and the branched ribs 102q is formed by partially bending the separator 102 upward in the stacking direction Z, and a space is defined therebelow.

In the separator 102, the space defined between each branched rib 102q and the metal support cell assembly 101 constitutes a branched channel 102V for the cathode gas CG from the cathode inlet 102c as shown in FIGS. 10 to 12. A space defined between the rib 102p and the metal support cell assembly 101 constitutes a looped channel 102W for causing the cathode gas CG to circulate along the outer edge of the separator 102.

In the separator 102, a major part of the cathode gas CG from the cathode inlet 102c flows into the flow channel portion 102L on the cathode side. Part of the cathode gas CG from the cathode inlet 102c flows into the branched channels 102V and circulates in the looped channel 102W as shown in FIGS. 10 to 12.

As shown in FIG. 4, the power collection assistance layer 103 is configured to maintain electric contact while defining the space for passing the gas between the power generation cell 101M and the separator 102, thereby assisting the electric contact between the power generation cell 101M and the separator 102.

The power collection assistance layer 103 is so-called expanded metal. The power collection assistance layer 103 is disposed between the power generation cell 101M and the flow channel portion 102L of the separator 102. The power collection assistance layer 103 has a similar external shape to the power generation cell 101M. The power collection assistance layer 103 is formed into a wire-mesh geometry provided with openings of a rhombic shape or the like in the form of a grating.

As shown in FIG. 4, the sealing unit 104 is configured to control the flows of the gases by partially sealing the gaps between the metal support cell assemblies 101 and the separator 102.

In particular, each of the sealing members (such as the anode outer edge sealing member 104A and the cathode outer edge sealing member 104C) is disposed between an edge of the corresponding metal support cell assembly 101 and an edge of the separator 102 and configured to retain any of the gases (the cathode gas CG and the anode gas AG) supplied to the power generation cell 101M between the metal support cell assembly 101 and the separator 102.

As shown in FIG. 4, the sealing unit 104 includes the anode outer edge sealing member 104A configured to annularly seal the outer edge of the separator 102, and the an anode manifold sealing member 104B located inward of the anode outer edge sealing member 104A and configured to annularly seal the separator 102 while warding off the cathode inlet 102c and the cathode outlet 102d, which are disposed on a lower surface of the separator 102 (a surface located on the lower side of the separator 102 of FIG. 4 and facing the anode). The cathode inlet 102c and the cathode outlet 102d are located between the anode outer edge sealing member 104A and the anode manifold sealing member 104B.

As shown in FIG. 4, the sealing unit 104 includes the cathode outer edge sealing member 104C configured to annularly seal the outer edge of the separator 102, and a pair of cathode manifold sealing members 104D configured to annularly seal the anode inlet 102a and the anode outlet 102b, which are disposed on an upper surface of the separator 102 (a surface located on the upper side of the separator 102 of FIG. 4 and facing the cathode). The sealing members constituting the sealing unit 104 have functions as a spacer and a sealing, and constitute so-called gaskets. Each sealing member constituting the sealing unit 104 is made of glass having heat resistance and a sealing property, for instance.

The sealing unit 104 controls the flow of the anode gas AG by using the anode outer edge sealing member 104A and the anode manifold sealing member 104B. Specifically, the sealing unit 104 causes the anode gas AG to flow into the anodes 101T of the power generation cells 101M as shown in FIG. 4 without causing a leakage to the cathodes 101U of the power generation cells 101M or to the outside. The anode gas AG is supplied to the anodes 101T of the power generation cells 101M through respective anode inlets in the external manifold 111, the lower end plate 109, the lower current collector plate 107, the module ends 105, the separators 102, and the metal support cell assemblies 101. In other words, the anode gas AG is supplied to a range from the external manifold 111 to the upper current collector plate 108 at the terminal end while being distributed to the anode flow channels provided in the gaps between the separators 102 and the metal support cell assemblies 101 that are alternately stacked. Thereafter, the anode gas AG reacts in the power generation cells 101M and is discharged in a state of an exhaust gas through anode outlets in the respective constituents mentioned above.

The sealing unit 104 controls the flow of the cathode gas CG by using the cathode outer edge sealing member 104C and the pair of cathode manifold sealing members 104D. Specifically, the sealing unit 104 causes the cathode gas CG to flow into the cathodes 101U of the power generation cells 101M as shown in FIG. 4 without causing a leakage to the anodes 101T of the power generation cells 101M or to the outside. The cathode gas CG is supplied to the cathodes 101U of the power generation cells 101M through respective cathode inlets in the external manifold 111, the lower end plate 109, the lower current collector plate 107, the module ends 105, the separators 102, and the metal support cell assemblies 101. In other words, the cathode gas CG is supplied to the range from the external manifold 111 to the upper current collector plate 108 at the terminal end while being distributed to the cathode flow channels provided in the gaps between the separators 102 and the metal support cell assemblies 101 that are alternately stacked. Thereafter, the cathode gas CG reacts in the power generation cells 101M and is discharged in the state of the exhaust gas through cathode outlets in the respective constituents mentioned above.

The sealing unit 104 has a dual sealing structure as shown in FIG. 4. Specifically, as shown in FIG. 4, the sealing unit 104 circulates the anode gas AG in a region surrounded by the anode manifold sealing member 104B and circulates the cathode gas CG in a region between the anode manifold sealing member 104B and the anode outer edge sealing member 104A. Meanwhile, as shown in FIG. 4, the sealing unit 104 circulates the anode gas AG in regions surrounded by the pair of cathode manifold sealing members 104D, respectively, and circulates the cathode gas CG in a region between the pair of cathode manifold sealing members 104D and the cathode outer edge sealing member 104C. As described above, the regions where the cathode gas CG is present are provided in such a way as to surround the regions where the anode gas AG is present both on the anode side and the cathode side.

As shown in FIG. 3, the module ends 105 are the end plates that hold the upper end and the lower end of the stacked units 100R.

The module ends 105 are disposed at the upper end and the lower end of the stacked units 100R. Each module end 105 has a similar external shape to the units 100R. Each module end 105 is made of a conductive material that does not transmit the gases and is insulated by using either an insulating material or a coating except for a region opposed to the corresponding power generation cell 101M. The insulating material is formed by fixing aluminum oxide to the module end 105, for example.

Each module end 105 is provided with an anode inlet 105a and an anode outlet 105b to allow passage of the anode gas AG, which are located on a diagonal line such that relative positions thereof coincide with the units 100R along the stacking direction Z. The module end 105 is provided with a cathode inlet 105c and a cathode outlet 105d to allow passage of the cathode gas CG, which are located on another diagonal line such that relative positions thereof coincide with the units 100R along the stacking direction Z.

As shown in FIG. 2, manifold sealing members 106 are located between stacked members and configured to seal outer edges of so-called manifold holes and thus to prevent leakage of the gases.

The manifold sealing members 106 have a similar configuration to those of the anode manifold sealing member 104B and the cathode manifold sealing members 104D. The manifold sealing members 106 are disposed in such a way as to annularly seal the outer edges of the inlets and the outlets for the gases between the upper current collector plate 108 and the uppermost cell module 100Q, between the cell modules 100Q that are adjacent to each other along the stacking direction Z, between the lowermost cell module 100Q and the lower current collector plate 107, between the lower current collector plate 107 and the lower end plate 109, and between the lower end plate 109 and the external manifold 111, respectively. The manifold sealing members 106 are made of glass having heat resistance and a sealing property, for instance.

The lower current collector plate 107 is shown in FIGS. 1 and 2 and is configured to output electric power generated by the units 100R to the outside.

The lower current collector plate 107 is disposed at a lower end of the stack 100P. The lower current collector plate 107 has a similar external shape to the units 100R. The lower current collector plate 107 is provided with a terminal 107f to be connected to an external current-carrying member. The terminal 107f is formed by causing an outer edge of the lower current collector plate 107 to partially project in the longitudinal direction Y. The lower current collector plate 107 is made of a conductive material that does not transmit the gases and is insulated by using either an insulating material or a coating except for a region opposed to the corresponding power generation cell 101M of the unit 100R and the portion corresponding to the terminal 107f. The insulating material is formed by fixing aluminum oxide to the lower current collector plate 107, for example.

The lower current collector plate 107 is provided with an anode inlet 107a and an anode outlet 107b to allow passage of the anode gas AG, which are located on a diagonal line such that relative positions thereof coincide with the units 100R along the stacking direction Z. The lower current collector plate 107 is provided with a cathode inlet 107c and a cathode outlet 107d to allow passage of the cathode gas CG, which are located on another diagonal line such that relative positions thereof coincide with the units 100R along the stacking direction Z.

The upper current collector plate 108 is shown in FIGS. 1 and 2 and is configured to output the electric power generated by the units 100R to the outside.

The upper current collector plate 108 is disposed at an upper end of the stack 100P. The upper current collector plate 108 has a similar external shape to the lower current collector plate 107. The upper current collector plate 108 is provided with a terminal 108f to be connected to the external current-carrying member. The terminal 108f is formed by causing an outer edge of the upper current collector plate 108 to partially project in the longitudinal direction Y. Unlike the lower current collector plate 107, the upper current collector plate 108 is not provided with an inlet or an outlet for any gas. The upper current collector plate 108 is made of a conductive material that does not transmit the gases and is insulated by using either an insulating material or a coating except for a region opposed to the corresponding power generation cell 101M of the unit 100R and the portion corresponding to the terminal 108f. The insulating material is formed by fixing aluminum oxide to the upper current collector plate 108, for example.

As shown in FIGS. 1 and 2, the lower end plate 109 is configured to hold the stack 100P from below, which is sandwiched between the lower current collector plate 107 and the upper current collector plate 108.

The lower end plate 109 is disposed below the lower current collector plate 107. The lower end plate 109 has a similar external shape to the units 100R. The lower end plate 109 is formed substantially thicker than the units 100R. The lower end plate 109 is made of a metal, for example, and its upper surface to come into contact with the lower current collector plate 107 is insulated by using an insulating material. The insulating material is formed by fixing aluminum oxide to the lower end plate 109, for example.

The lower end plate 109 is provided with an anode inlet 109a and an anode outlet 109b to allow passage of the anode gas AG, which are located on a diagonal line such that relative positions thereof coincide with the units 100R along the stacking direction Z. The lower end plate 109 is provided with a cathode inlet 109c and a cathode outlet 109d to allow passage of the cathode gas CG, which are located on another diagonal line such that relative positions thereof coincide with the units 100R along the stacking direction Z.

As shown in FIGS. 1 and 2, the upper end plate 110 is configured to hold the stack 100P from above, which is sandwiched between the lower current collector plate 107 and the upper current collector plate 108.

The upper end plate 110 is disposed above the upper current collector plate 108. The upper end plate 110 has a similar external shape to the lower end plate 109. Unlike the lower end plate 109, the upper end plate 110 is not provided with an inlet or an outlet for any gas. The upper end plate 110 is made of a metal, for example, and its lower surface to come into contact with the upper current collector plate 108 is insulated by using an insulating material. The insulating material is formed by fixing aluminum oxide to the upper end plate 110, for example.

The external manifold 111 is shown in FIGS. 1 and 2 and is configured to supply the gases from the outside to the units 100R.

The external manifold 111 is disposed below the lower end plate 109. The external manifold 111 has a similar external shape to the units 100R. The external manifold 111 is formed substantially thicker than the lower end plate 109. The external manifold 111 is made of a metal, for example.

The external manifold 111 is provided with an anode inlet 111a and an anode outlet 111b to allow passage of the anode gas AG, which are located on a diagonal line such that relative positions thereof coincide with the units 100R along the stacking direction Z. The external manifold 111 is provided with a cathode inlet 111c and a cathode outlet 111d to allow passage of the cathode gas CG, which are located on another diagonal line such that relative positions thereof coincide with the units 100R along the stacking direction Z.

As shown in FIGS. 10 to 12, a heat exchange part 191 is disposed adjacent to the sealing members (such as the anode outer edge sealing member 104A and the cathode outer edge sealing member 104C) and is configured to perform temperature control of the sealing members (such as the anode outer edge sealing member 104A and the cathode outer edge sealing member 104C) by using the gas (such as the cathode gas CG) that is supplied in response to a variation in load on the power generation cell 101M.

As shown in FIGS. 10 to 12, the heat exchange part 191 uses a branched portion of a heated oxidant gas (the cathode gas CG) to be supplied to the cathode 101U. The heat exchange part 191 may use a branched portion of a heated fuel gas (the anode gas AG) to be supplied to the anode 101T.

The heat exchange part 191 is formed from the separator 102 and the metal support cell assembly 101 described above. The heat exchange part 191 is disposed adjacent to the sealing members (such as the anode outer edge sealing member 104A and the cathode outer edge sealing member 104C) that are aligned with each other in the stacking direction Z. The heat exchange part 191 is formed by supplying the gas (such as the cathode gas CG) into a space defined between the edge of the metal support cell assembly 101 and a first rib (the rib 102p) that is formed by bending the edge of the separator 102 into the convex shape. In other words, in the separator 102, part of the cathode gas CG from the separator 102c flows into the branched channels 102V and circulates inside the looped channel 102W as shown in FIGS. 10 to 12.

Figure 13:
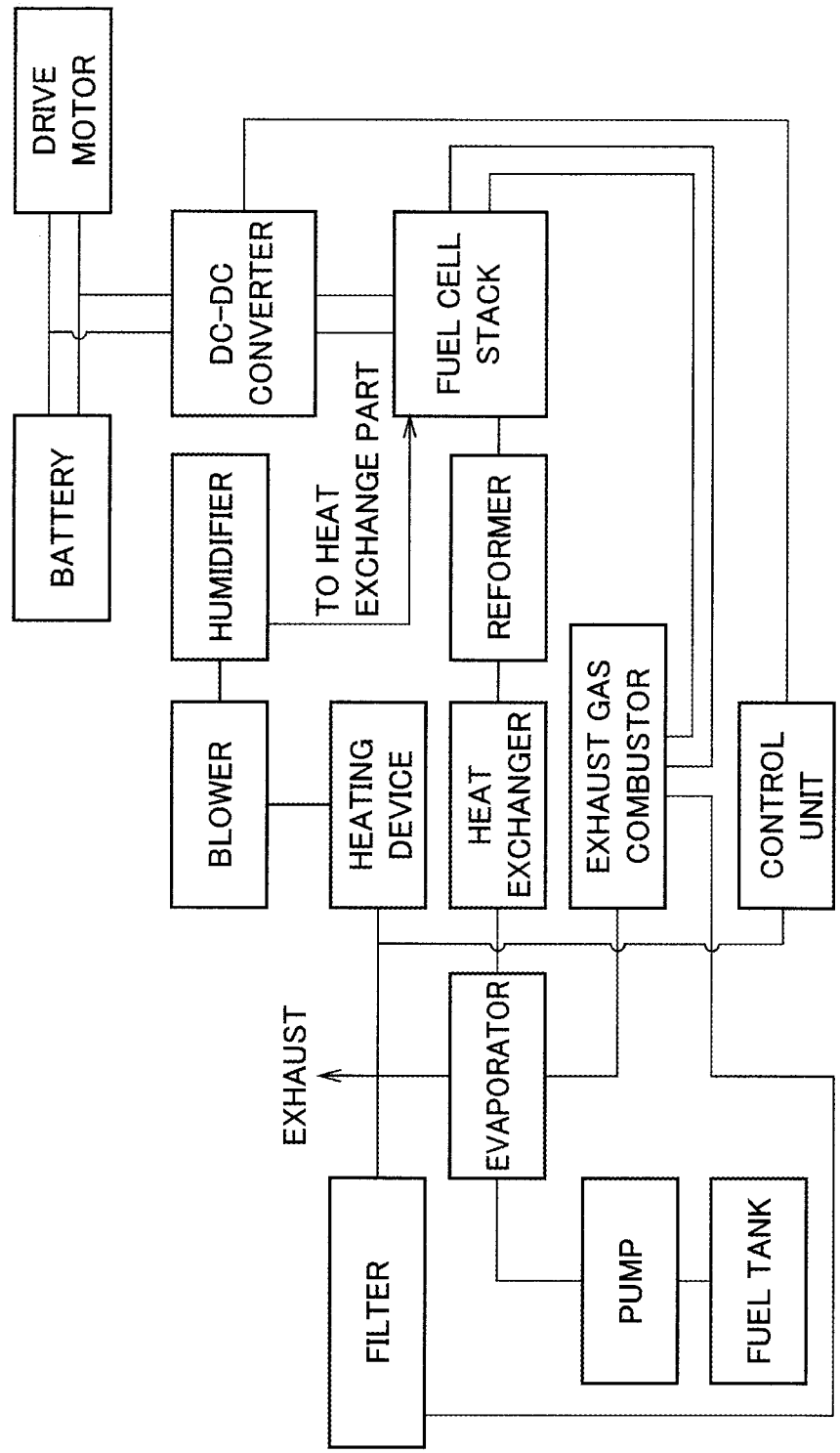
FIG. 13 is a block diagram showing an overall configuration of the first embodiment.

Here, as shown in a block diagram of FIG. 13, the anode gas AG is supplied from a fuel tank to the solid oxide fuel cell stack while being passed through a heat exchanger (the heat exchange part 191) and a reformer by using a pump. The cathode gas CG is supplied from the atmosphere to the solid oxide fuel cell stack while being passed through a humidifier by using a blower. A fuel cell system involving the solid oxide fuel cell stack 100 is formed by the configuration shown in FIG. 13. To be more precise, the fuel cell system includes the solid oxide fuel cell stack 100, a fuel supply subsystem that supplies the fuel to the solid oxide fuel cell stack 100, an air supply subsystem that supplies air to the solid oxide fuel cell stack 100, an exhaust subsystem that discharges the exhaust gas from the solid oxide fuel cell stack 100, and a control device that controls these subsystems. Specifically, in the fuel cell system, a power generation cell assembly (the metal support cell assembly 101) includes the heat exchange part 191 configured to perform the temperature control of the sealing members (such as the anode outer edge sealing member 104A and the cathode outer edge sealing member 104C) disposed in the cell assembly. The control device selectively activates the heat exchange part 191 at system start-up.

Figure 14:
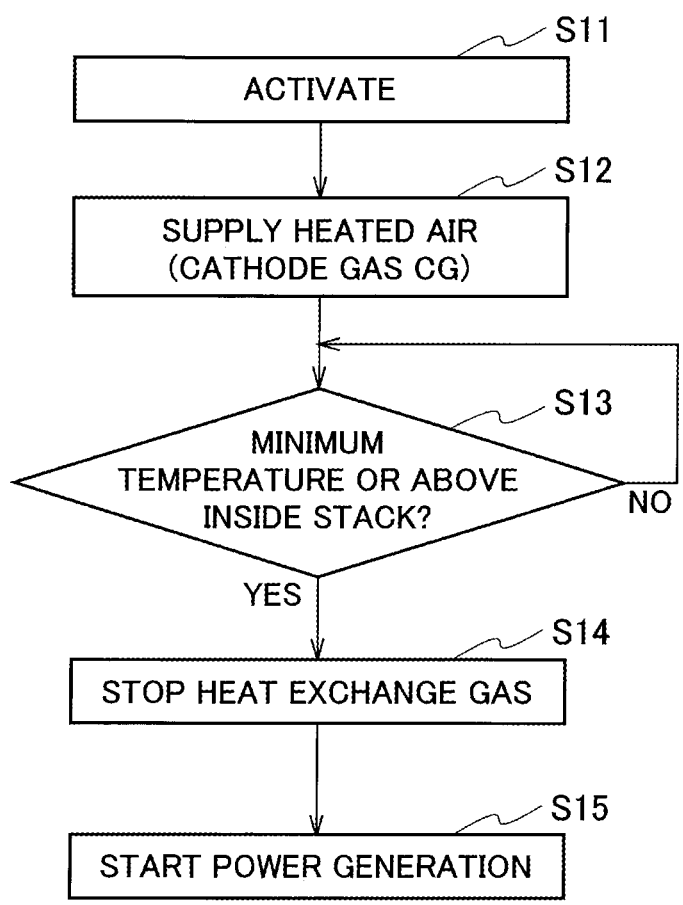
FIG. 14 is a flowchart showing operations of a heat exchanger of the first embodiment.

Meanwhile, as shown in a flowchart of FIG. 14, when the solid oxide fuel cell stack 100 is activated (S11), the solid oxide fuel cell stack 100 receives the supply of the cathode gas CG corresponding to the heated air (S12). Moreover, the solid oxide fuel cell stack 100 determines whether or not a stack 100 has a temperature equal to or above a minimum temperature (S13). When the determination turns out to be yes, the solid oxide fuel cell stack 100 stops the supply of a heat exchange gas (S14) and starts power generation (S15). On the other hand, if the determination turns out to be no in S13, the solid oxide fuel cell stack 100 returns to the determination in S13 after a lapse of a predetermined time period.

Operations and effects of the above-described first embodiment will be explained.

A cell structure for the solid oxide fuel cell stack 100 includes the power generation cell assemblies (the metal support cell assemblies 101), the separator 102, the sealing members (such as the anode outer edge sealing member 104A and the cathode outer edge sealing member 104C), and the heat exchange part 191. Each metal support cell assembly 101 includes the power generation cell 101M formed by sandwiching the electrolyte 101S between the fuel electrode (the anode 101T) and the oxidant electrode (the cathode 101U) and configured to generate power by using the gases (the cathode gas CG and the anode gas AG) supplied thereto. The separator 102 separates the adjacent power generation cells 101 from each other. The heat exchange part 191 is disposed adjacent to the sealing members and performs the temperature control of the sealing members by using the gas (such as the cathode gas CG) supplied to the power generation cell 101M.

The fuel cell system includes the solid oxide fuel cell stack 100 formed by stacking the power generation cell assemblies, the fuel supply subsystem that supplies the fuel to the solid oxide fuel cell stack 100, the air supply subsystem that supplies the air to the solid oxide fuel cell stack 100, the exhaust subsystem that discharges the exhaust gas from the solid oxide fuel cell stack 100, and the control device that controls these subsystems. In the fuel cell system, the power generation cell assembly (the metal support cell assembly 101) includes the heat exchange part 191 that performs the temperature control of the sealing members (such as the anode outer edge sealing member 104A and the cathode outer edge sealing member 104C) disposed in the cell assembly. The control device selectively activates the heat exchange part 191 at system start-up.

According to the cell structure for the solid oxide fuel cell stack 100 described above, the sealing members are subjected to the temperature control by the gas supplied to the power generation cell 101M. Specifically, the cell structure for the solid oxide fuel cell stack 100 can sufficiently relax a sharp temperature gradient that may occur between the metal support cell assembly 101 and the sealing member or between the separator 102 and the sealing member as a consequence of feeding the gas at a high temperature for achieving quick activation. As a consequence, the cell structure for the solid oxide fuel cell stack 100 can be quickly activated while protecting the sealing members each disposed between the metal support cell assembly 101 and the separator 102.

In particular, the cell structure for the solid oxide fuel cell stack 100 can be quickly activated while sufficiently protecting the sealing members each disposed between the metal support cell assembly 101 and the separator 102 in the case of performing the temperature control of the sealing members (such as the anode outer edge sealing member 104A and the cathode outer edge sealing member 104C) by using the gas (such as the cathode gas CG) supplied in response to the variation in load on the power generation cell 101M.

Specifically, when the sealing members are formed from glass or braze, the cell structure for the solid oxide fuel cell stack 100 can prevent detachment thereof by relaxing a heat stress. Meanwhile, when the sealing members are formed from compression seals, the solid oxide fuel cell stack 100 can prevent uplift thereof by relaxing the heat stress.

In the cell structure for the solid oxide fuel cell stack 100, it is preferable to dispose the heat exchange part 191 adjacent to the sealing members (such as the anode outer edge sealing member 104A and the cathode outer edge sealing member 104C) that are aligned with each other in the stacking direction Z.

The above-described cell structure for the solid oxide fuel cell stack 100 can sufficiently suppress the temperature variation, which may occur in the sealing members, by efficiently performing the temperature control of the sealing members from above and below in the stacking direction Z. As a consequence, the cell structure for the solid oxide fuel cell stack 100 can be quickly activated while protecting the sealing members each disposed between the metal support cell assembly 101 and the separator 102.

In the cell structure for the solid oxide fuel cell stack 100, of a first surface (a bottom surface) extending along the directions (the longitudinal direction Y and the lateral direction X) orthogonal to the stacking direction Z of the sealing member (such as the anode outer edge sealing member 104A or the cathode outer edge sealing member 104C) and a second surface (a side surface) extending along the stacking direction Z of the sealing member, the heat exchange part 191 is preferably disposed adjacent to one of the first surface (the bottom surface) and the second surface (the side surface) having a relatively larger contact area.

The above-described cell structure for the solid oxide fuel cell stack 100 can increase a heat conduction area (the bottom surface) with respect to the sealing members and shorten a heat conduction distance (a height of the side surface) with respect to the sealing members. In other words, it is possible to perform effective temperature control while suppressing the temperature distribution that may occur in the sealing members. As a consequence, the cell structure for the solid oxide fuel cell stack 100 can be quickly activated while protecting the sealing members each disposed between the metal support cell assembly 101 and the separator 102.

In the cell structure for the solid oxide fuel cell stack 100, it is preferable to form the heat exchange part 191 by supplying the gas (such as the cathode gas CG) into the space defined between the edge of the metal support cell assembly 101 and the first rib (the rib 102p) that is formed by bending the edge of the separator 102 into the convex shape. The rib 102p is disposed adjacent to the sealing members (such as the anode outer edge sealing member 104A and the cathode outer edge sealing member 104C).

According to the above-described cell structure for the solid oxide fuel cell stack 100, it is possible to form the heat exchange part 191 at low cost by processing the rib 102p together with the flow channel portion 102L having the shapes similar to each other in the course of molding the separator 102, for example. In the meantime, by processing the rib 102p at the time of molding the separator 102 that involves a relatively large number of processing steps in the first place, it is possible to form the heat exchange part 191 at low cost while suppressing the impact of the proportion of processing the rib 102p in the molding of the separator 102. Thus, the cell structure for the solid oxide fuel cell stack 100 can be quickly activated while protecting the sealing members each disposed between the metal support cell assembly 101 and the separator 102 with a low-cost configuration.

In the cell structure for the solid oxide fuel cell stack 100, the rib 102p preferably has the sealing member (such as the anode outer edge sealing member 104A or the cathode outer edge sealing member 104C) stacked thereon, and the area of the surface on which the sealing member is stacked is preferably larger than the area of contact with the sealing member.

According to the above-described cell structure for the solid oxide fuel cell stack 100, it is possible to sufficiently heat the sealing members through the rib 102p. Thus, the cell structure for the solid oxide fuel cell stack 100 can be quickly activated while protecting the sealing members each disposed between the metal support cell assembly 101 and the separator 102 with the simple configuration.

In the cell structure for the solid oxide fuel cell stack 100, the heat exchange part 191 preferably uses a branched portion of at least any of the heated oxidant gas (the cathode gas CG) to be supplied to the cathode 101U and the heated fuel gas (the anode gas AG) to be supplied to the anode 101T. In this embodiment, the heat exchange part 191 uses the branched portion of the cathode gas CG.

According to the above-described cell structure for the solid oxide fuel cell stack 100, it is possible to heat the sealing members by using the cathode gas CG which is chemically stable and is inexpensive. Moreover, there is no need to provide new components. Thus, the cell structure for the solid oxide fuel cell stack 100 can be quickly activated while protecting the sealing members each disposed between the metal support cell assembly 101 and the separator 102 with due consideration of safety and cost.

In the cell structure for the solid oxide fuel cell stack 100, the heat exchange part 191 preferably uses the exhaust gas obtained after the reaction of the gases in the power generation cells 101M.

According to the above-described cell structure for the solid oxide fuel cell stack 100, it is possible to heat the sealing members by using the exhaust gas which is in the state of a high temperature after the chemical reaction and is supposed to be discharged to the outside. Thus, the cell structure for the solid oxide fuel cell stack 100 can be activated quickly and very efficiently while protecting the sealing members each disposed between the metal support cell assembly 101 and the separator 102.

(First to Fourth Modified Examples of First Embodiment)

Solid oxide fuel cell stacks according to first to fourth modified examples of the first embodiment realize the heat exchange part 191 of the solid oxide fuel cell stack 100 of the first embodiment by adopting various other configurations (heat exchange parts 192 to 195) as shown in FIGS. 15A to 15D.

FIGS. 15A to 15D are side views showing cross-sections of the heat exchange parts 192 to 195 of the first to fourth modified examples of the first embodiment.

Figure 15A:
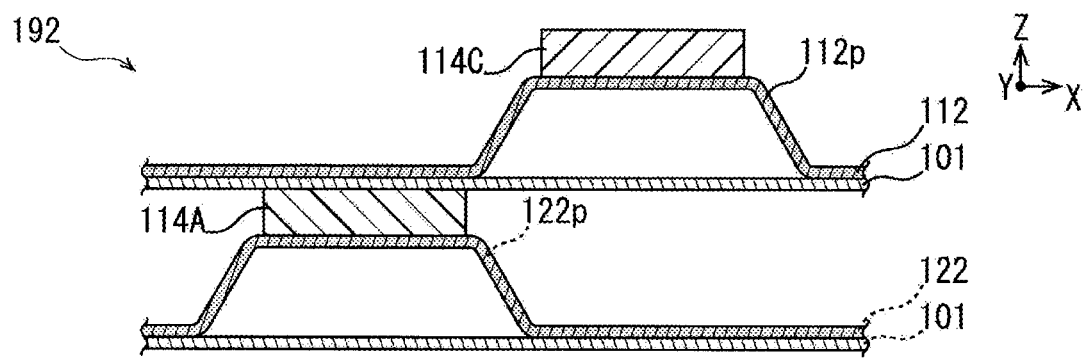
FIG. 15A is a side view showing a cross-section of a heat exchange part of a first modified example of the first embodiment.

FIG. 15A shows the heat exchange part 192 of the first modified example.

As shown in FIG. 15A, paired separators 112 and 122 are alternately stacked while interposing the metal support cell assembly 101 in-between. The paired separators 112 and 122 include a looped rib 112p and a looped rib 122p provided on outer edges as with the separator 102. The looped rib 112p of the one separator 112 is smaller than the rib 102p of the separator 102 in terms of a planar direction in the lateral direction X and the longitudinal direction Y. The looped rib 122p of the other separator 122 is larger than the rib 102p of the separator 102 in terms of the planar direction in the lateral direction X and the longitudinal direction Y. The looped rib 112p of the one separator 112 is located inside of the looped rib 122p of the other separator 122 in terms of the planar direction in the lateral direction X and the longitudinal direction Y. A cathode outer edge sealing member 114C is stacked on the rib 112p of the separator 112. The cathode outer edge sealing member 114C is smaller than the cathode outer edge sealing member 104C in terms of the planar direction in the lateral direction X and the longitudinal direction Y. An anode outer edge sealing member 114A is stacked on the rib 122p of the separator 122. The anode outer edge sealing member 114A is smaller larger than the anode outer edge sealing member 104A in terms of the planar direction in the lateral direction X and the longitudinal direction Y.

Figure 15B:
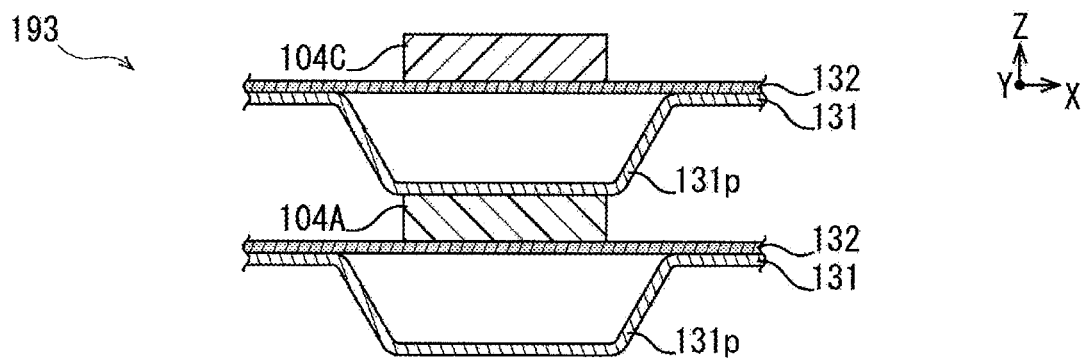
FIG. 15B is a side view showing a cross-section of a heat exchange part of a second modified example of the first embodiment.

FIG. 15B shows the heat exchange part 193 of the second modified example.

As shown in FIG. 15B, no ribs are provided on an outer edge of a separator 132 unlike the separator 102. On the other hand, a looped rib 131p is provided on an outer edge of a metal support cell assembly 131. The rib 131p is formed by bending the outer edge of the metal support cell assembly 131 into a convex shape so as to project downward in the stacking direction Z. In the metal support cell assemblies 131 that are stacked while interposing the separator 132 in-between, the anode outer edge sealing member 104A and the cathode outer edge sealing member 104C are alternately stacked on lower ends of the ribs 131p.

Figure 15C:
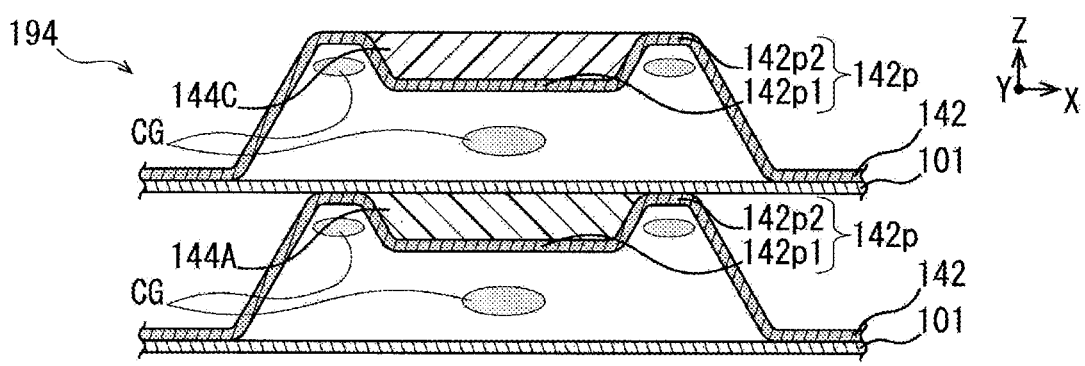
FIG. 15C is a side view showing a cross-section of a heat exchange part of a third modified example of the first embodiment.

FIG. 15C shows the heat exchange part 194 of the third modified example.

As shown in FIG. 15C, a looped rib 142p is provided on an outer edge of a separator 142 as with the separator 102. The rib 142p is provided with a central part 142p1 to stack an anode outer edge sealing member 144A or a cathode outer edge sealing member 144C, and a pair of end parts 142p2 formed by bending two ends of the central part 142p1 into a convex shape so as to project upward in the stacking direction Z. Side surfaces of the anode outer edge sealing member 144A and the cathode outer edge sealing member 144C are in contact with the pair of end parts 142p2, respectively. When the anode outer edge sealing member 144A or the cathode outer edge sealing member 144C is stacked on the central part 142p1 of the rib 142p, a height of an upper end of either the anode outer edge sealing member 144A or the cathode outer edge sealing member 144C becomes equal to a height of the pair of the end parts 142p2.

Figure 15D:
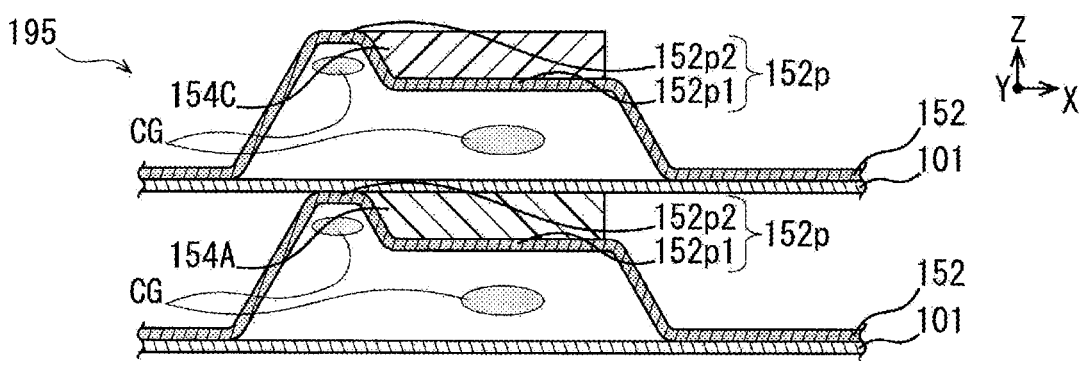
FIG. 15D is a side view showing a cross-section of a heat exchange part of a fourth modified example of the first embodiment.

FIG. 15D shows the heat exchange part 195 of the fourth modified example.

As shown in FIG. 15D, a rib 152p is provided on an outer edge of a separator 152 as with the separator 102. As with the rib 142p shown in FIG. 15C, the rib 152p is provided with a central part 152p1 to stack an anode outer edge sealing member 154A or a cathode outer edge sealing member 154C. Unlike the rib 142p shown in FIG. 15C, the rib 152p is provided with an end part 152p2 which is formed by bending only one end of the central part 152p1 into a convex shape so as to project upward in the stacking direction Z. The rib 152p is located more on the outside of the separator 152 than the central part 152p1 is. Side surfaces of the anode outer edge sealing member 154A and the cathode outer edge sealing member 154C are in contact with the end part 152p2, respectively. When the anode outer edge sealing member 154A or the cathode outer edge sealing member 154C is stacked on the central part 152p1 of the rib 152p, a height of an upper end of either the anode outer edge sealing member 154A or the cathode outer edge sealing member 154C becomes equal to a height of the end part 152p2.

Operations and effects of the above-described first to fourth modified examples of the first embodiment will be explained.

In the cell structure for the solid oxide fuel cell stack, the heat exchange part 192 shown in FIG. 15A is disposed adjacent to the sealing members (the anode outer edge sealing member 114A and the cathode outer edge sealing member 114C) that are displaced with each other along the stacking direction Z.

According to the cell structure for the solid oxide fuel cell stack described above, it is possible to sufficiently suppress the temperature distribution that may occur in the sealing members by effectively performing the temperature control of the sealing members over a wide range (within the plane in the longitudinal direction Y and the lateral direction X) from above and below in the stacking direction Z. As a consequence, the cell structure for the solid oxide fuel cell stack can be quickly activated while protecting the sealing members each disposed between the metal support cell assembly 101 and the separator 102.

In the cell structure for the solid oxide fuel cell stack, the heat exchange part 193 shown in FIG. 15B is formed by supplying the gas (such as the cathode gas CG) into a space defined between a second rib (the rib 131p), which is formed by bending the edge of the metal support cell assembly 131 into the convex shape, and the edge of the separator 132. The rib 131p is disposed adjacent to the sealing members (such as the anode outer edge sealing member 104A and the cathode outer edge sealing member 104C).

According to the cell structure for the solid oxide fuel cell stack described above, it is also possible not only to form the rib on the separator 102 but also to form the rib 131p on the metal support cell assembly 131. Thus, the mode of realizing the heat exchange part 193 can be selected at discretion. As a consequence, the cell structure for the solid oxide fuel cell stack can be quickly activated with versatility while protecting the sealing members each disposed between the metal support cell assembly 101 and the separator 102.

In the cell structure for the solid oxide fuel cell stack, the rib 142p constituting the heat exchange part 194 shown in FIG. 15C is provided with the central part 142p1 to stack the anode outer edge sealing member 144A or the cathode outer edge sealing member 144C, and the pair of end parts 142p2 formed by bending the two ends of the central part 142p1 into the convex shape so as to project upward in the stacking direction Z.

According to the cell structure for the solid oxide fuel cell stack described above, even when the heated sealing members are softened, the pair of end parts 142p2 that project into the convex shape can sufficiently retain the shape of each sealing member. Moreover, it is possible to heat the sealing members through the bottom surface and the two side surfaces of each of the sealing members. As a consequence, the cell structure for the solid oxide fuel cell stack can be quickly activated while protecting the sealing members each disposed between the metal support cell assembly 101 and the separator 142.

In the cell structure for the solid oxide fuel cell stack, the rib 152p constituting the heat exchange part 195 shown in FIG. 15D is provided with the central part 152p1 to stack the anode outer edge sealing member 154A or the cathode outer edge sealing member 154C, and the end part 152p2 formed by bending the one end located on an outer side of the central part 152p1 into the convex shape so as to project upward in the stacking direction Z.

According to the cell structure for the solid oxide fuel cell stack described above, even when the heated sealing members are softened, the end part 152p2 that projects into the convex shape can sufficiently retain the shape of each sealing member and can prevent the sealing members from moving outward due to pressures of the gases. Moreover, it is possible to heat the sealing members through the bottom surface and one of the side surfaces of each of the sealing members. In particular, it is possible to keep the side surface of each sealing member from being exposed to a low temperature region on the outside. As a consequence, the cell structure for the solid oxide fuel cell stack can be quickly activated while protecting the sealing members each disposed between the metal support cell assembly 101 and the separator 152.

Second Embodiment

Figure 16:
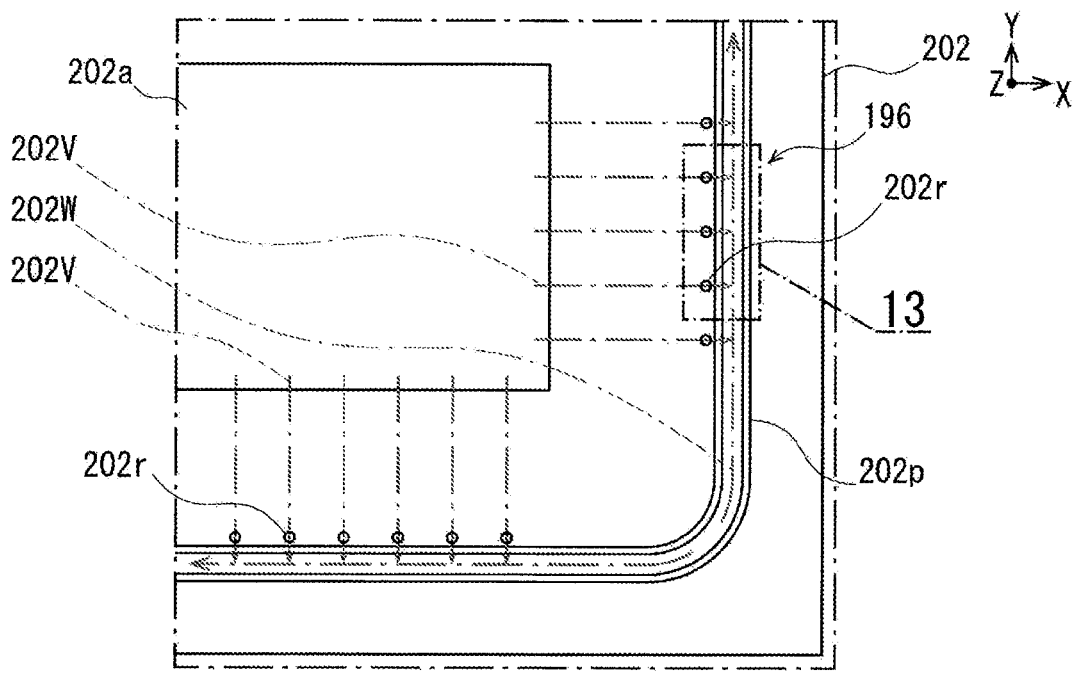
FIG. 16 is a top plan view showing a circumference of an anode inlet in a stacked state of a metal support cell assembly, a separator, an anode outer edge sealing member, and a cathode outer edge sealing member according to a solid oxide fuel cell stack of a second embodiment.
Figure 17:
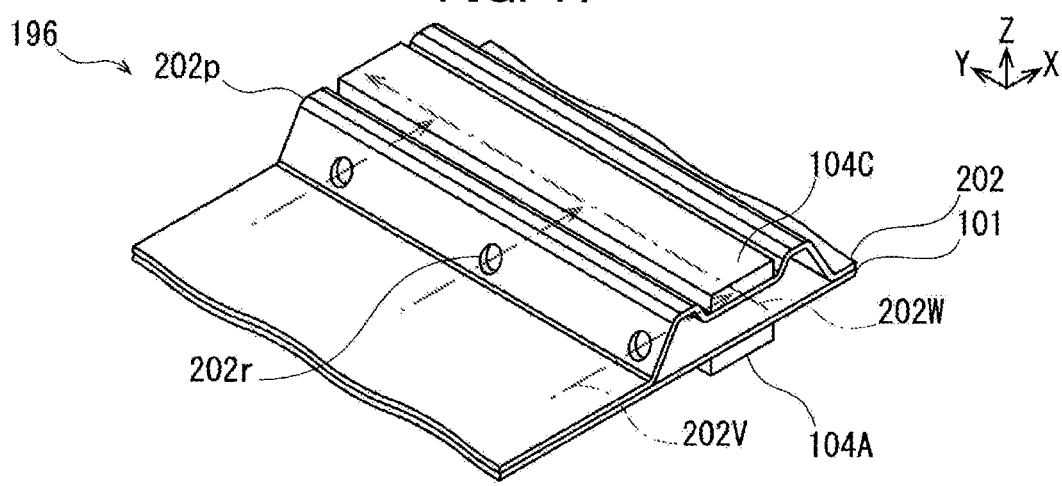
FIG. 17 is a perspective view showing branched parts for an anode gas in FIG. 16.
Figure 18:
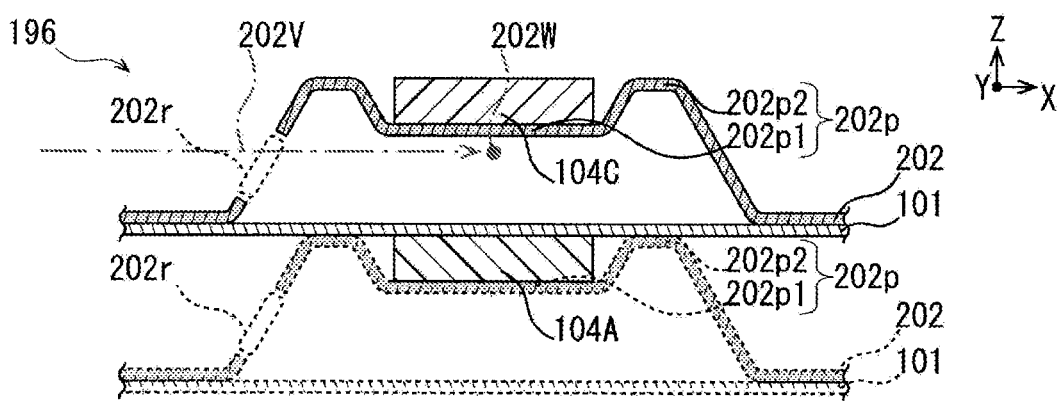
FIG. 18 is a side view showing a cross-section of the branched parts for the anode gas in FIG. 16.

As shown in FIGS. 16 to 18, a solid oxide fuel cell stack of a second embodiment is different from the heat exchange part of the solid oxide fuel cell stack 100 of the first embodiment in that a heat exchange part 196 is formed in such a way as to branch the anode gas AG from an anode inlet 202a of a separator 202. In the first embodiment, the heat exchange part is formed in such a way as to branch the cathode gas CG.

FIG. 16 is a top plan view showing a circumference of the anode inlet 202a in a stacked state of the metal support cell assembly 101, the separator 202, the anode outer edge sealing member 104A, and the cathode outer edge sealing member 104C according to the solid oxide fuel cell stack of the second embodiment. FIG. 17 is a perspective view showing branched parts for the anode gas AG in FIG. 16. FIG. 18 is a side view showing a cross-section of the branched parts for the anode gas AG in FIG. 16.

The heat exchange part 196 uses a second exhaust gas obtained after the heated anode gas AG supplied to the anode 101T reacts at the anode 101T. The heat exchange part 196 may use the branched portion of the heated oxidant gas (the cathode gas CG) to be supplied to the cathode 101U.

As shown in FIGS. 16 to 18, the separator 202 constituting the heat exchange part 196 is provided with a looped rib 202p on its outer edge. The rib 202p is formed in such a way as to surround four sides on the outer edge of the separator 202. The rib 202p is provided with a central part 202p1 to stack the anode outer edge sealing member 104A or the cathode outer edge sealing member 104C, and a pair of end parts 202p2 formed by bending two ends of the central part 202p1 into a convex shape so as to project upward in the stacking direction Z. The rib 202p is formed by partially bending the separator 202 upward in the stacking direction Z, and a space is defined therebelow.

When the separators 202 are stacked while interposing the metal support cell assembly 101 in-between, the anode outer edge sealing member 104A and the cathode outer edge sealing member 104C are alternately stacked on the central parts 202p1 of the respective ribs 202p. In the case where the anode outer edge sealing member 104A or the cathode outer edge sealing member 104C is stacked on the central part 202p1 of the rib 202p, the height of the upper end of either the anode outer edge sealing member 104A or the cathode outer edge sealing member 104C becomes equal to a height of upper ends of the pair of the end parts 202p2.

Each separator 202 includes circular ventilation holes 202r that are opened in an inner side surface of the convex rib 202p. Multiple ventilation holes 202r are provided along the lateral direction X and the longitudinal direction Y of the separator 202 in the inner side surface of the rib 202p opposed to the rectangular anode inlet 202a.

In the separator 202, each ventilation hole 202r constitutes a branched channel 202V for the anode gas AG from the anode inlet 202a. A space defined between the rib 202p and the metal support cell assembly 101 constitutes a looped channel 202W for causing the anode gas AG to circulate along the outer edge of the separator 202.

In the separator 202, a major part of the anode gas AG from the anode inlet 202a flows into a flow channel portion on the anode side. Part of the anode gas AG from the anode inlet 202a flows into the ventilation holes 202r serving as the branched channels 202V and circulates in the looped channel 202w as shown in FIGS. 16 to 18.

Operations and effects of the above-described second embodiment will be explained.

In the solid oxide fuel cell stack, the heat exchange part 196 uses a branched portion of the heated fuel gas (the anode gas AG) supplied to the anode 101T.

According to the above-described cell structure for the solid oxide fuel cell stack, it is possible to heat the sealing members by using not only the cathode gas CG but also the anode gas AG. Moreover, there is no need to provide new components. Thus, the cell structure for the solid oxide fuel cell stack can be quickly activated with versatility while protecting the sealing members each disposed between the metal support cell assembly 101 and the separator 202.

In the cell structure for the solid oxide fuel cell stack, the heat exchange part 196 preferably uses the second exhaust gas obtained after the heated anode gas AG supplied to the anode 101T reacts at the anode 101T.

According to the above-described cell structure for the solid oxide fuel cell stack, it is possible to heat the sealing members by using the exhaust gas which is in the state of a high temperature after the chemical reaction and is supposed to be discharged to the outside. Thus, the cell structure for the solid oxide fuel cell stack can be activated quickly and very efficiently while protecting the sealing members each disposed between the metal support cell assembly 101 and the separator 202.

Third Embodiment

As shown in FIGS. 19 to 23, a solid oxide fuel cell stack of a third embodiment is different from the heat exchange parts of the solid oxide fuel cell stacks of the first and second embodiments in that a heat exchange part 197 is configured in such a way as to supply the gas (the cathode gas CG) from an independent inlet (a second cathode inlet 302x) of a separator 302. In each of the first and second embodiments, the heat exchange part is configured in such a way as to branch the gas from the ordinary inlet for supplying the gas to the power generation cell 101M.

Figure 19:
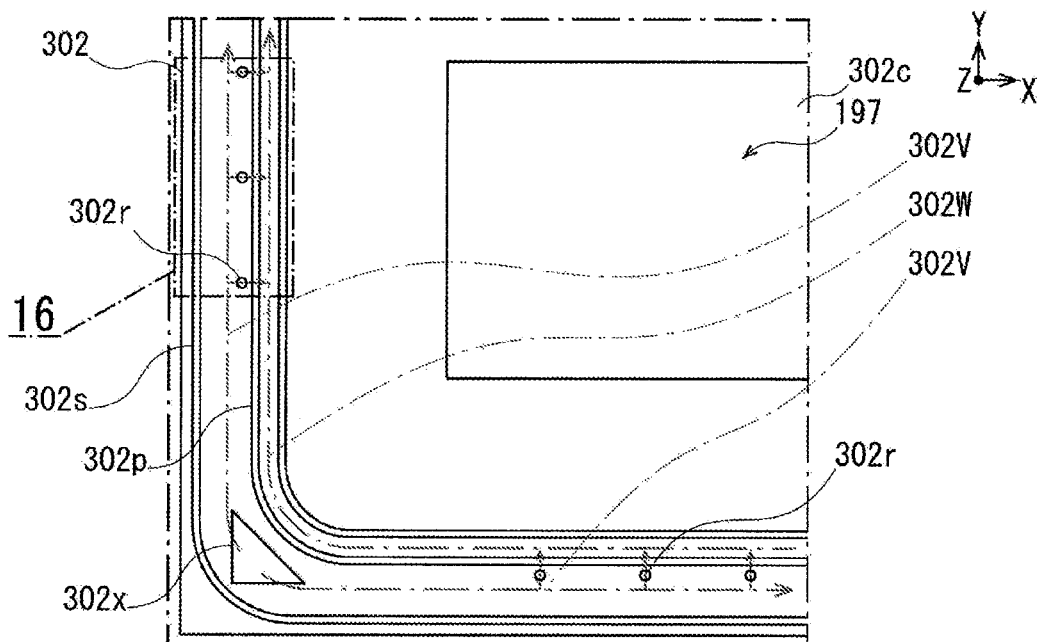
FIG. 19 is a top plan view showing a circumference of a second cathode inlet in a stacked state of a metal support cell assembly, a separator, an anode outer edge sealing member, and a cathode outer edge sealing member according to a solid oxide fuel cell stack of a third embodiment.
Figure 20:
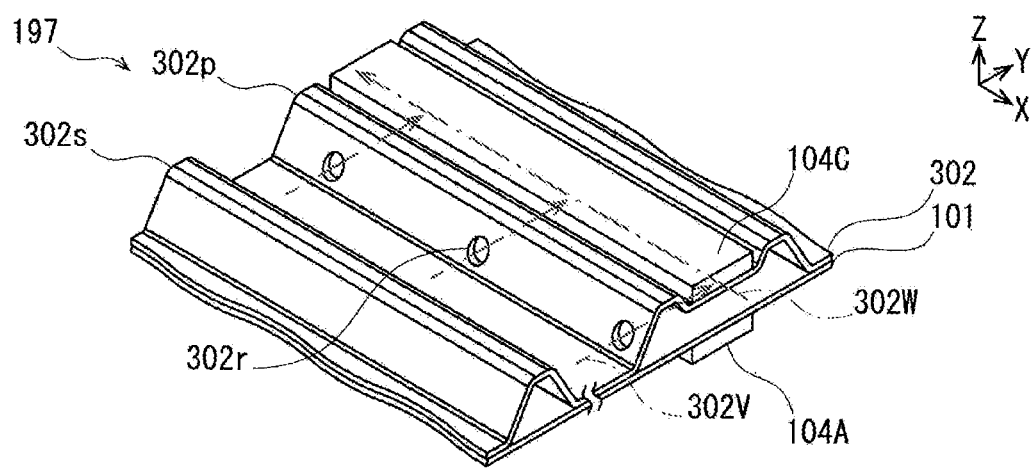
FIG. 20 is a perspective view showing branched parts for a cathode gas in FIG. 19.
Figure 21:
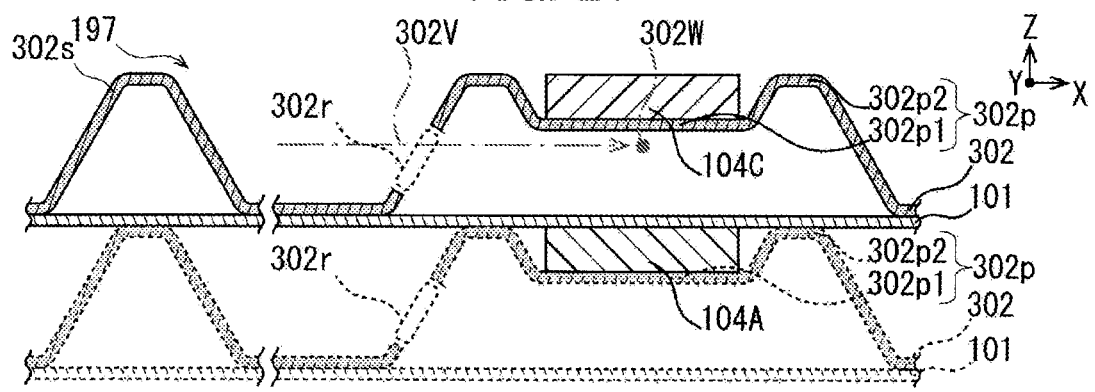
FIG. 21 is a side view showing a cross-section of the branched parts for the cathode gas in FIG. 19.

FIG. 19 is a top plan view showing a circumference of the second cathode inlet 302x in a stacked state of the metal support cell assembly 101, the separator 302, the anode outer edge sealing member 104A, and the cathode outer edge sealing member 104C according to the solid oxide fuel cell stack of the third embodiment. FIG. 20 is a perspective view showing branched parts for the cathode gas CG in FIG. 19. FIG. 21 is a side view showing a cross-section of the branched parts for the cathode gas CG in FIG. 19.

The heat exchange part 197 independently uses either the heated cathode gas CG to be supplied to the cathode 101U or the heated anode gas AG to be supplied to the anode 101T.

As shown in FIGS. 19 to 21, the separator 302 constituting the heat exchange part 197 is provided with a looped rib 302p on its outer edge. The rib 302p has a similar configuration to the rib 202p shown in FIGS. 16 to 18.

The separator 302 includes circular ventilation holes 302r that are opened in the rib 302p. Unlike the ventilation holes 202r opened in the inner side surface of the rib 202p shown in FIGS. 16 to 18, the ventilation holes 302r are opened in an outer side surface of the rib 302p. Multiple ventilation holes 302r are provided along the lateral direction X and the longitudinal direction Y of the separator 302 in the outer side surface of the rib 302p.

The separator 302 is provided with a looped second rib 302s in such a way as to surround the rib 302p from its outer side. The second rib 302s has a similar configuration to that of the rib 102p shown in FIGS. 6 and 9 except for the size in terms of the planar direction in the lateral direction X and the longitudinal direction Y. The second rib 302s is larger than the rib 102p shown in FIGS. 6 and 9 in terms of the planar direction in the lateral direction X and the longitudinal direction Y.

As shown in FIG. 19, the separator 302 is provided with the second cathode inlet 302x located between the rib 302p and the second rib 302s and configured to independently circulate the cathode gas CG. The second cathode inlet 302x is smaller than a cathode inlet 302c. In addition to the separator 302, the second cathode inlet is provided to the external manifold 111, the lower end plate 109, the lower current collector plate 107, the module end 105, and the metal support cell assembly 101.

In the separator 302, a space defined between the rib 302p and the second rib 302s and the ventilation holes 302r constitute branched channels 302V for the cathode gas CG from the second cathode inlet 302x. A space defined between the rib 302p and the metal support cell assembly 101 constitutes a looped channel 302W for causing the cathode gas CG to circulate along the outer edge of the separator 302.

In the separator 302, the cathode gas CG from the second cathode inlet 302x flows into the branched channels 302V and circulates in the looped channel 302W as shown in FIGS. 19 to 21.

Figure 22:
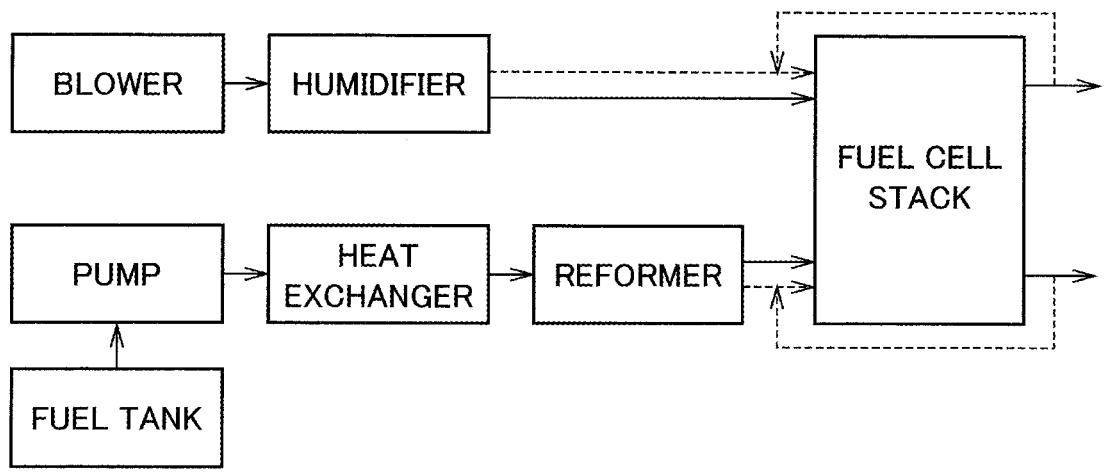
FIG. 22 is a block diagram showing a configuration of the third embodiment.

As shown in a block diagram of FIG. 22, the anode gas AG is supplied from the fuel tank to the solid oxide fuel cell stack while being passed through the heat exchanger (the heat exchange part 197) and the reformer by using a pump. The cathode gas CG is supplied from the atmosphere to the solid oxide fuel cell stack while being passed through the humidifier by using a blower.

Figure 23:
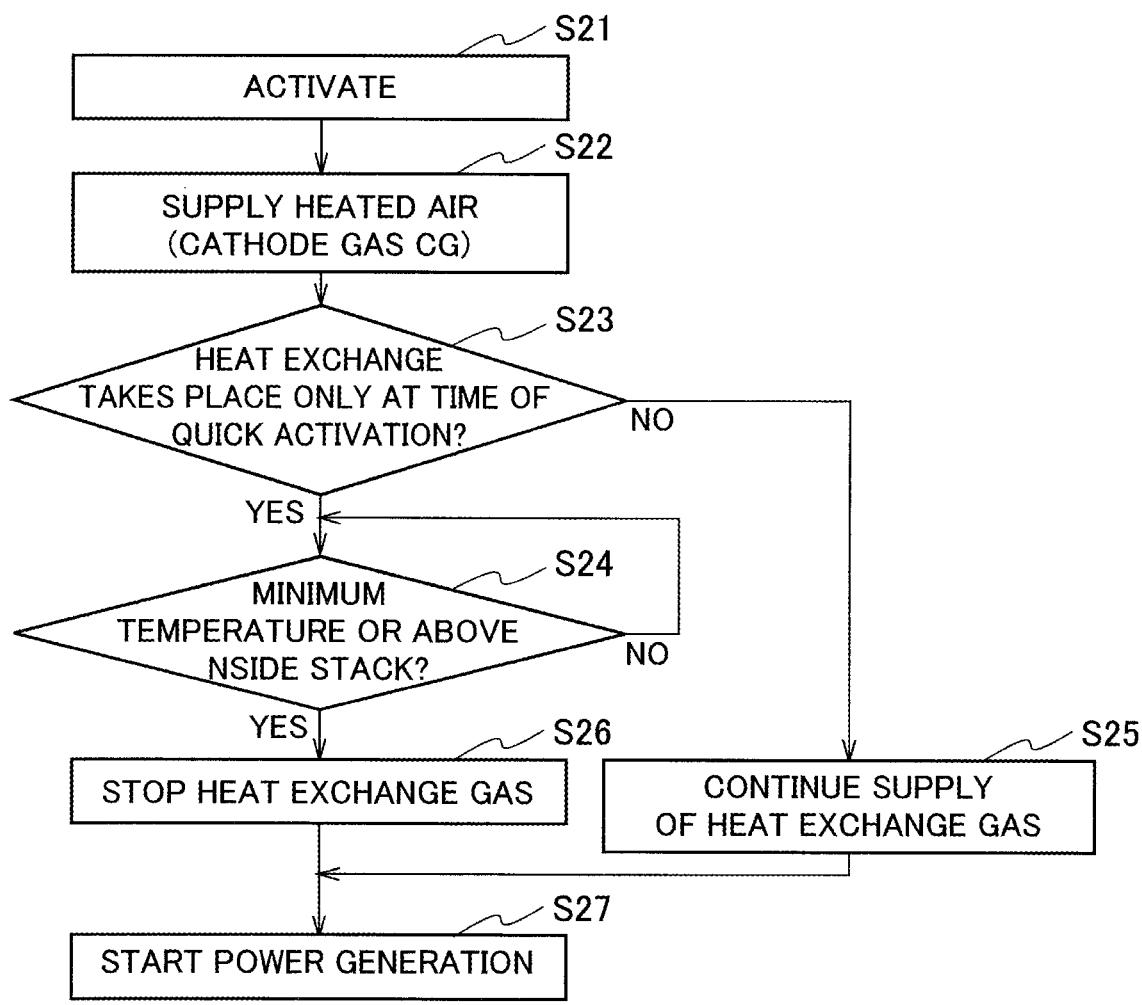
FIG. 23 is a flowchart showing operations of a heat exchanger of the third embodiment.

As shown in a flowchart of FIG. 23, when the solid oxide fuel cell stack is activated (S21), the solid oxide fuel cell stack receives the supply of the cathode gas CG corresponding to the heated air (S22). At this time, solid oxide fuel cell stack determines whether or not the heat exchange takes place only at the time of quick activation (S23). When the determination turns out to be yes, the solid oxide fuel cell stack determines whether or not the solid oxide fuel cell stack has a temperature equal to or above a minimum temperature (S24). Moreover, when the determination turns out to be yes, the solid oxide fuel cell stack stops the supply of the heat exchange gas (S26) and starts power generation (S27). If the determination turns out to be no in S24, the solid oxide fuel cell stack returns to the determination in S24 after a lapse of a predetermined time period. Meanwhile, if the determination turns out to be no in S23, the solid oxide fuel cell stack continues the supply of the heat exchange gas (S25) and starts the power generation (S27).

Operations and effects of the above-described third embodiment will be explained.

In the cell structure for the solid oxide fuel cell stack, the heat exchange part 197 independently uses at least any of the heated cathode gas CG to be supplied to the cathode 101U and the heated anode gas AG to be supplied to the anode 101T.

According to the above-described cell structure for the solid oxide fuel cell stack, it is possible to heat the sealing members without affecting the power generation by the power generation cell 101M at all. In addition, it is also possible to prevent so-called a side flow of the gas. Thus, the cell structure for the solid oxide fuel cell stack can be quickly activated while protecting the sealing members each disposed between the metal support cell assembly 101 and the separator 302 without having to consider power generation efficiency.

In the cell structure for the solid oxide fuel cell stack, the heat exchange part 197 is preferably operated at least when the power generation cell 101M is heated at a predetermined rate or faster.

According to the cell structure for the solid oxide fuel cell stack describe above, the operation of the heat exchange part 197 only at the time of quick activation makes it possible to suppress the usage of the gas for heating the sealing members in the case of an operation in a steady state. Thus, the cell structure for the solid oxide fuel cell stack can be quickly activated while protecting the sealing members each disposed between the metal support cell assembly 101 and the separator 302 and suppressing cost at the same time.

In addition, the present invention can be modified in various other modes based on the configurations defined in the claims, and the present invention encompasses such modifications as well.

The cell structure for the solid oxide fuel cell stack has been explained based on the configuration to dispose the heat exchange part adjacent to the anode outer edge sealing member and to the cathode outer edge sealing member. Instead, the cell structure may be configured to dispose the heat exchange part adjacent to the anode manifold sealing member and to the cathode manifold sealing member. Alternatively, the heat exchange part may be disposed adjacent to the outer edge sealing members and to the manifold sealing members at the same time.

In the cell structure for a solid oxide fuel cell stack, the heat exchange part may be configured by a combination of the specifications of any of the heat exchange parts of the first to third embodiments as appropriate.

REFERENCE SIGNS LIST 100 solid oxide fuel cell stack,
100P stack,
100Q cell module,
100R unit,
101, 131 metal support cell assembly (power generation cell assembly),
101M power generation cell,
101N metal support cell,
101S electrolyte,
101T anode (fuel electrode),
101U cathode (oxidant electrode),
101V support metal,
101W cell frame,
101e opening,
102, 112, 122, 132, 142, 152, 202, 302 separator,
102L flow channel portion,
102h flat portion,
102i anode projection
102j cathode projection
102p, 112p, 122p, 131p, 142p, 152p, 202p, 302p rib (first rib or second rib),
142p1, 152p1, 202p1, 302p1 central part,
142p2, 152p2, 202p2, 302p2 end part,
102q branched rib,
202r, 302r ventilation hole,
302s second rib,
102V, 202V, 302V branched channel,
102W, 202W, 302W looped channel,
103 power collection assistance layer,
104 sealing unit,
104A, 114A, 144A, 154A anode outer edge sealing member,
104B anode manifold sealing member,
104C, 114C, 144C, 154C cathode outer edge sealing member,
104D cathode manifold sealing member,
105 module end,
106 manifold sealing member,
107 lower current collector plate,
107f terminal,
108 upper current collector plate,
108f terminal,
109 lower end plate,
110 upper end plate,
111 external manifold,
101a, 102a, 105a, 107a, 109a, 111a, 202a anode inlet,
101b, 102b, 105b, 107b, 109b, 111b anode outlet,
101c, 102c, 105c, 107c, 109c, 111c, 302c cathode inlet,
101d, 102d, 105d, 107d, 109d, 111d cathode outlet,
302x second cathode inlet,
191, 192, 193, 194, 195, 196, 197 heat exchange part,
AG anode gas,
CG cathode gas,
X lateral direction (of solid oxide fuel cell stack)
Y longitudinal direction (of solid oxide fuel cell stack), and
Z stacking direction (of solid oxide fuel cell stack).

The invention claimed is:

1. A cell structure for a fuel cell comprising:
a plurality of power generation cell assemblies stacked adjacent to each other in a stacking direction, each power generation cell assembly including a power generation cell which includes a fuel electrode, an oxidant electrode, and an electrolyte sandwiched therebetween and is configured to generate power by using supplied gases;
a separator configured to separate the adjacent power generation cell assemblies from each other;
a first sealing member disposed between an edge of a corresponding one of the power generation cell assemblies and an edge of the separator and configured to retain the gases supplied to the power generation cells between the corresponding power generation cell assembly and the separator; and
a heat exchange part configured to perform temperature control of the first sealing member by using the gases supplied to the power generation cells, wherein
the heat exchange part comprises one of a first heat exchange part or a second heat exchange part,
the first heat exchange part comprises:
a first rib including a portion of the separator bent to project in the stacking direction, a first surface on which the first sealing member is disposed, and a second surface opposite to the first surface, the first rib extending along the first sealing member in a direction orthogonal to the stacking direction;
a first portion of one of the power generation cell assemblies disposed adjacent to the first rib in the stacking direction, the first portion including a third surface facing the second surface of the first rib; and
a first flow channel defined by the second surface and the third surface, and through which the supplied gases flow, and
the second heat exchange part comprises:
a second rib including a portion of one of the power generation cell assemblies bent to project in the stacking direction, a fourth surface on which the first sealing member is disposed, and a fifth surface opposite to the fourth surface, the second rib extending along the first sealing member in a direction orthogonal to the stacking direction;
a second portion of the separator disposed adjacent to the second rib in the stacking direction, the second portion including a sixth surface facing the fifth surface of the second rib; and
a second flow channel defined by the fifth surface and the sixth surface and through which the supplied gases flow.

2. The cell structure for a fuel cell according to claim 1, wherein one of
the first portion of the one power generation cell assembly including the third surface is disposed adjacent to a second sealing member located at a displaced position along the stacking direction, the second portion of the separator including the sixth surface is disposed adjacent to a second sealing member located at a position aligned with the first sealing member in the stacking direction, the first portion of the one power generation cell assembly including the third surface is disposed adjacent to a second sealing member located at a position aligned with the first sealing member in the stacking direction, or the second portion of the separator including the sixth surface is disposed adjacent to a second sealing member located at a displaced position along the stacking direction.

3. The cell structure for a fuel cell according to claim 1, wherein
the first sealing member includes a first side surface orthogonal to the stacking direction, and a second side surface parallel to the stacking direction,
at least one of the first rib or the second rib is disposed adjacent to and in contact with one of the first side surface and the second side surface having a larger surface area.

4. The cell structure for a fuel cell according to claim 1, wherein
a surface area of at least one of the first surface of the first rib or the fourth surface of the second rib is larger than a surface area of a surface of the first sealing member that is in contact with at least one of the first surface or the fourth surface.

5. The cell structure for a fuel cell according to claim 1, wherein
at least one of the first rib or the second rib includes:
a central part upon which the first sealing member is stacked; and
a pair of end parts extending from the central part and bent such as to project away from the central part in, at least partially, the stacking direction.

6. The cell structure for a fuel cell according to claim 1, wherein
at least one of the first rib or the second rib includes:
a central part upon which the first sealing member is stacked; and
a single end part extending from the central part and bent such as to project away from the central part in, at least partially, the stacking direction.

7. The cell structure for a fuel cell according to claim 1, wherein
each power generation cell assembly includes at least one inlet through which the supplied gases flow into the power generation cell,
the at least one inlet is connected to at least one of the first flow channel or the second flow channel at a position upstream from the power generation cell such that a portion of the supplied gases flow into the first flow channel or the second flow channel at a location upstream from the power generation cell, and
a portion of the supplied gases flowing through the at least one inlet to the oxidant electrode is a heated oxidant gas, and a portion of the supplied gases flowing through the at least one inlet to the fuel electrode is a heated fuel gas.

8. The cell structure for a fuel cell according to claim 1, wherein
each of the power generation cell assemblies includes an outlet through which an exhaust gas produced from a reaction of the supplied gases in the power generation cell flows out of the power generation cell, and the outlet is connected to at least one of the first flow channel or the second flow channel and is downstream of the power generation cell such that a portion of the exhaust gas flows into the first flow channel and away from the power generation cell, and an other portion of the exhaust gas flows into the second flow channel and away from the power generation cell.

9. The cell structure for a fuel cell according to claim 1, further comprising:
a first gas flow channel allowing the supplied gases to flow through each power generation cell; and
a second gas flow channel independent from the first gas flow channel, the second gas flow channel allowing the supplied gases to bypass the power generation cell, wherein
at least one of the first flow channel or the second flow channel is connected to the second gas flow channel.

10. The cell structure for a fuel cell according to claim 1, wherein,
in the first heat exchange part, the first sealing member is in contact with the first rib, and in a cross-sectional area of the first heat exchange part in a stacking direction view, a width of the first flow channel is larger than a width of a contact area between the first sealing member and the first rib, and
in the second heat exchange part, a second sealing member is in contact with the second rib, and in a cross-sectional area of the second heat exchange part in the stacking direction view, a width of the second flow channel is larger than a width of a contact area between the first sealing member and the second rib.

11. A fuel cell system comprising:
a fuel cell stack;
a fuel supply subsystem configured to supply a fuel to the fuel cell stack;
an air supply subsystem configured to supply air to the fuel cell stack;
an exhaust subsystem configured to discharge an exhaust gas from the fuel cell stack; and
a control device configured to control the subsystems, wherein
the fuel cell stack comprises:
a plurality of power generation cell assemblies stacked adjacent to each other in a stacking direction, each power generation cell assembly including a power generation cell which includes a fuel electrode, an oxidant electrode, and an electrolyte sandwiched therebetween and is configured to generate power by using supplied fuel and air;
a separator configured to separate the adjacent power generation cell assemblies from each other;
a sealing member disposed between an edge of a corresponding one of the power generation cell assemblies and an edge of the separator and configured to retain the fuel or air supplied to the power generation cells between the corresponding power generation cell assembly and the separator; and
a heat exchange part configured to perform temperature control of the sealing member by using any of the fuel or air supplied to the power generation cells,
the heat exchange part comprises one of a first heat exchange part or a second heat exchange part,
the first heat exchange part comprises:
a first rib including a portion of the separator bent to project in the stacking direction, a first surface on which the sealing member is disposed, and a second surface opposite to the first surface, the first rib extending along the sealing member in a direction orthogonal to the stacking direction;

a first portion of the power generation cell assembly disposed adjacent to the first rib in the stacking direction, the first portion including a third surface facing the second surface of the first rib; and a first flow channel defined by the second surface and the third surface, and through which at least one of the fuel or air flow, the second heat exchange part comprises:

a second rib including a portion of the power generation cell assembly bent to project in the stacking direction, a fourth surface on which the sealing member is disposed, and a fifth surface opposite to the fourth surface, the second rib extending along the sealing member in a direction orthogonal to the stacking direction;

a second portion of the separator disposed adjacent to the second rib in the stacking direction, the second portion including a sixth surface facing the fifth surface of the second rib; and a second flow channel defined by the fifth surface and the sixth surface and through which at least one of the fuel or air flow, and the control device selectively activates the heat exchange part at system start-up.

12. A cell structure for a fuel cell comprising:

a plurality of power generation cell assemblies stacked adjacent to each other in a stacking direction, each power generation cell assembly including a power generation cell which includes a fuel electrode, an oxidant electrode, and an electrolyte sandwiched therebetween and is configured to generate power by using supplied gases;

a separator configured to separate the adjacent power generation cell assemblies from each other;

a sealing member disposed between an edge of a corresponding one of the power generation cell assemblies and an edge of the separator and configured to retain the gases supplied to the power generation cells between the corresponding power generation cell assembly and the separator; and a heat exchange part configured to perform temperature control of the sealing member by using the gases supplied to the power generation cells, wherein the heat exchange part is formed by supplying the gases into a space defined between the edge of the corresponding power generation cell assembly and a first rib that is formed by bending the edge of the separator into a convex shape or into a space defined between a second rib formed by bending the edge of the corresponding power generation cell assembly into a convex shape and the edge of the separator, and any of the first rib and the second rib is disposed adjacent to the sealing member.

* * * * *